United States Patent
Yamagishi et al.

(10) Patent No.: US 7,058,532 B1
(45) Date of Patent: Jun. 6, 2006

(54) FLOWMETER

(75) Inventors: Kiyoshi Yamagishi, Ageo (JP); Atsushi Koike, Ageo (JP); Takayuki Takahata, Ageo (JP); Hiromitsu Miyajima, Ageo (JP); Shinya Furuki, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 344 days.

(21) Appl. No.: 10/111,578

(22) PCT Filed: Oct. 30, 2000

(86) PCT No.: PCT/JP00/07624

§ 371 (c)(1),
(2), (4) Date: Apr. 26, 2002

(87) PCT Pub. No.: WO01/31299

PCT Pub. Date: May 3, 2001

(30) Foreign Application Priority Data

| Oct. 29, 1999 | (JP) | ............................................. | 11/309007 |
| Dec. 9, 1999 | (JP) | ............................................. | 11/350363 |
| Dec. 28, 1999 | (JP) | ............................................. | 11/373631 |
| Feb. 16, 2000 | (JP) | ............................................. | 2000-37974 |
| Mar. 16, 2000 | (JP) | ............................................. | 200-74634 |

(51) Int. Cl.
*G01F 1/68* (2006.01)

(52) U.S. Cl. .................... 702/100; 702/45; 73/204.15; 73/204.22

(58) Field of Classification Search .............. 73/204.18, 73/204.19, 204.13, 204.15, 204.22, 204.26; 702/100, 104, 45
See application file for complete search history.

(56) References Cited

U.S. PATENT DOCUMENTS 3,891,391 A * 6/1975 Boone ...................... 73/204.18
5,753,815 A * 5/1998 Murata ..................... 73/204.15

FOREIGN PATENT DOCUMENTS

| JP | 01288726 A | 11/1989 |
| JP | 08094406 A | 4/1996 |
| JP | 11094604 A | 4/1999 |
| JP | 11153466 A | 6/1999 |

* cited by examiner

*Primary Examiner*—Kamini Shah
(74) *Attorney, Agent, or Firm*—Pitney Hardin, LLP

(57) ABSTRACT

A flowmeter for achieving a fluid flow rate value by using calibration curves on the basis of the output of a detection circuit using a bridge circuit (73) containing as constituent resistors respective temperature sensing elements of a flow rate detector containing a heating element (33) and a fluid temperature detector in an indirectly heated type flow rate sensor unit. The bridge circuit (73) varies the circuit characteristic value in plural steps by a multiplexer (731) for selectively connecting the output terminal and any one of the connection terminals between the in-series connected resistors. Plural calibration curves are provided in association with the steps of the circuit characteristic value, and any one of the plural calibration curves is selected in accordance with the step of the circuit characteristic value selected by the multiplexer (731). The flow rate range to be measured is set every calibration curve, and the multiplexer (731) is controlled in accordance with the fluid flow rate value thus achieved, and the calibration curve corresponding to the flow rate range to which the flow rate value belongs. According to this flowmeter, the flow rate can be measured with excellent precision over a board flow rate range.

6 Claims, 25 Drawing Sheets

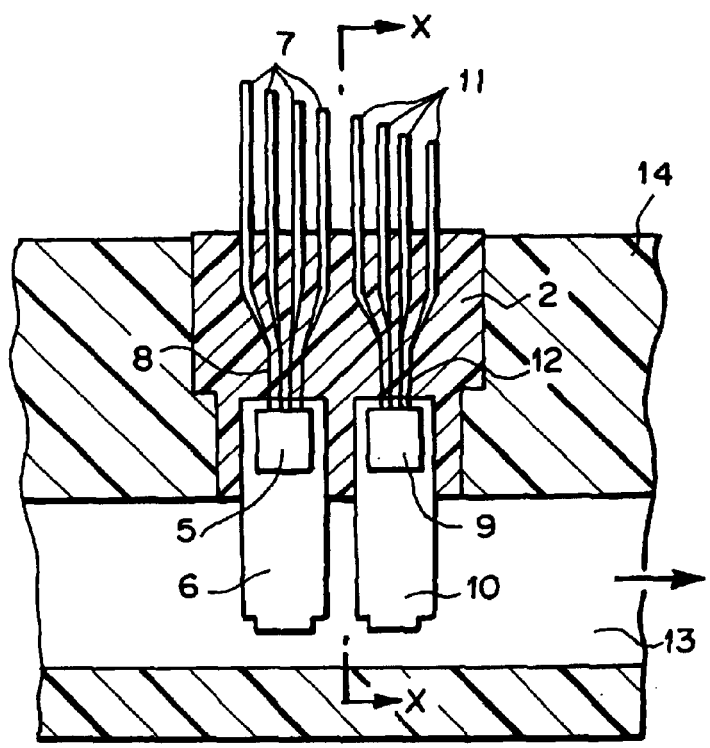
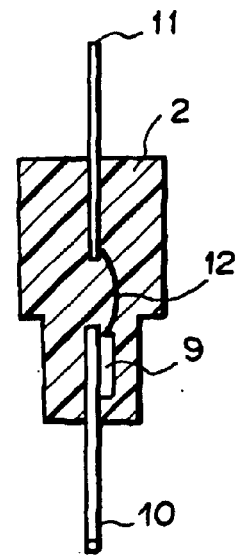
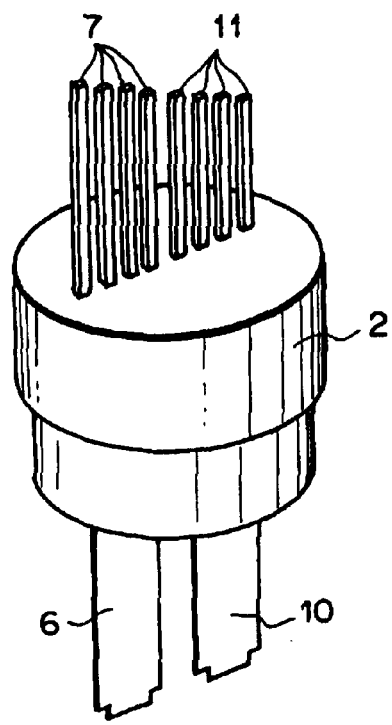

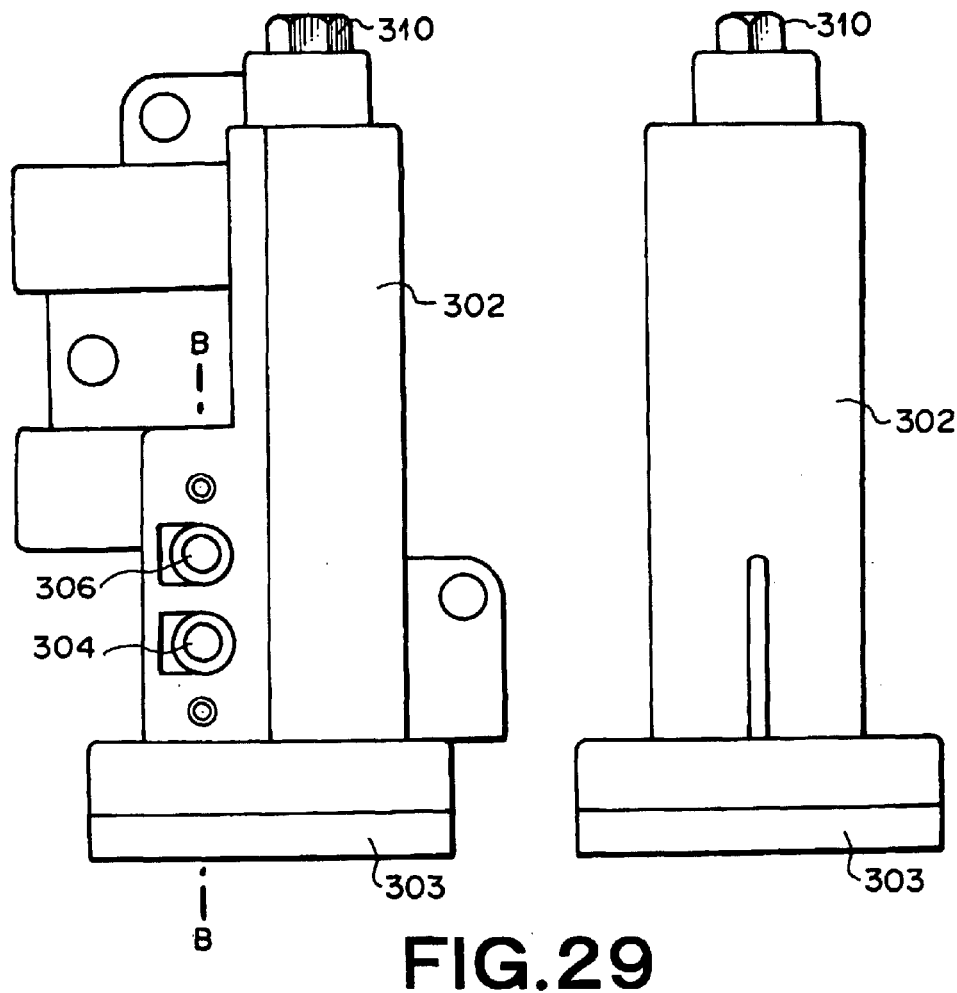

FLOWMETER

TECHNICAL FIELD

The present invention relates to a fluid flow rate detecting technique, and particularly to a flowmeter for measuring the flow rate or integrated flow amount of fluid flowing in a pipe. Furthermore, the present invention relates to a thermal type flowmeter such as an indirectly heated type flowmeter or the like, and further to a thermal type flowmeter having a fluid temperature compensating function.

BACKGROUND TECHNIQUE

Various types have been known for a flowmeter [flow rate sensor] (or current meter [flow velocity sensor]) for measuring the flow rate (or flow velocity) of various kinds of fluid, particularly liquid. Of these types of flowmeters, a so-called thermal type (particularly, indirectly heated type) flowmeter has been used because the price thereof is lower.

One of indirectly heated type flowmeters is designed and used so that a sensor chip comprising a thin-film heating element and a thin-film temperature sensing element which are laminated on a substrate through an insulating layer by using the thin film technique is disposed so as to enable the heat transfer between the sensor chip and fluid flowing in a pipe. The electrical characteristic of the temperature sensing element, for example, the value of the electrical resistance is varied by supplying current to the heating element to heat the temperature sensing element. The variation of the electrical resistance value (based on increase of the temperature of the temperature sensing element) is varied in accordance with the flow rate (flow velocity) of the fluid flowing in the pipe. This is because a part of the heating value of the heating element is transferred into the fluid, the heating value thus diffused into the fluid is varied in accordance with the flow rate (flow velocity), and the heating value supplied to the temperature sensing element is varied in accordance with the variation of the heating value diffused into the fluid, so that the electrical resistance value of the temperature sensing element is varied. The variation of the electrical resistance value of the temperature sensing element is also varied in accordance with the temperature of the fluid. Therefore, a temperature sensing element for temperature compensation is installed in an electrical circuit for measuring the variation of the electrical resistance value of the temperature sensing element to reduce the variation of the flow rate measurement value due to the temperature of the fluid as much as possible.

With respect to the indirectly heated type flowmeter using the thin-film element as described above, JP(A)-11-118566 discloses an example of the indirectly heated type flowmeter. The flowmeter disclosed in this publication uses an electrical circuit (detection circuit) containing a bridge circuit to achieve the electrical output corresponding to a flow rate of fluid.

It is general that the output of the electrical circuit of the flowmeter is not in a simply proportional relationship with the flow rate value, and variation of the output of the electrical circuit to the flow rate variation is large in an area where the flow rate value is small while the variation of the output of the electrical circuit to the flow rate variation is small in an area where the flow rate value is large. Therefore, there is a problem that even when little error occurs on measured flow rate values due to the variation of the output of the electrical circuit in the small flow rate value area, the error is increased in the large flow rate value area (that is, the rate of the flow rate difference to be discriminable when the measurement is carried out is increased).

In order to avoid this problem, it has been hitherto general that a flowmeter is prepared for each relatively narrow flow rate range and the characteristic value of the electrical circuit is properly set every flow rate range. Therefore, if attention is paid to each individual flowmeter, it has a problem that the dynamic range of the flow rate measurement is small and the application of the indirectly heated type flowmeter suffers restriction.

Therefore, an object of the present invention is to provide an indirectly heated type flowmeter which can perform a flow rate measurement with excellent precision over a broad flow rate range.

In the flowmeter disclosed in JP(A)-11-118566, the voltage to be applied to the heating element is varied in accordance with the variation of the flow rate to thereby vary the heating state of the heating element so that the temperature sensing element is kept to a predetermined temperature (heating state), and the flow rate value is achieved on the basis of the voltage applied to the heating element at this time.

The environmental temperature at which the flowmeter is used is broad. For example, when the flowmeter is used in a cold district, the temperature of the flowmeter may be kept under 5° C. or less. On the other hand, when the flowmeter is used in a hot district, the temperature of the flowmeter may be kept at 35° C. or more. Even when the flowmeter is used in the same district, the environmental temperature of the flowmeter is varied in accordance with day and night. Accordingly, when the flow rate value is achieved on the basis of the voltage to be applied to the heating element as described above, there is a problem that the measurement value is varied in accordance with the environmental temperature, which is caused by variation of the characteristic of the electrical circuit of the flowmeter due to the temperature variation.

The present invention has another object to improve the control of an applied voltage to the heating element in the indirectly heated type flowmeter as described above and achieve high precision and high control response without complicating the circuit construction.

Further, the present invention has another object to prevent the variation of the measurement value due to the environmental temperature in the indirectly heated type flowmeter as described above, and further enhance the precision of the flowmeter.

When the flow rate detection is carried out by using the thermal type flowmeter, the following problems occur due to the variation of the temperature of fluid for which the flow rate is detected.

For example, in a case where a kerosene flow passage is formed by a pipe so as to extend from a kerosene tank disposed outdoors to kerosene burning equipment disposed indoors and a flowmeter is disposed in an indoor portion of the pipe, if there is a large difference between the outdoor temperature and the indoor temperature (for example, the difference in temperature may be equal to about 20° C. in the winter season), kerosene remaining in the indoor portion of the pipe first passes through the flowmeter at the initial stage where use of the kerosene burning equipment is started, and after some amount of kerosene passes through the flowmeter, kerosene existing in the outdoor portion of the pipe at the initial stage reaches the flowmeter to be detected in flow rate.

In most cases, a fluid temperature detecting unit containing a temperature sensing element for temperature compensation installed in a fluid flow rate detecting circuit is disposed at a position different from that of a fluid flow rate detecting unit, or even when they are disposed to be near to each other, a heat-exchange portion of the fluid flow rate detecting unit at which heat exchange is actually carried out to detect the fluid flow rate is far away from a heat-exchange portion of the fluid temperature detecting unit at which heat exchange is actually carried out to detect the fluid temperature. In these cases., if fluid which quickly varies in temperature flows into the flowmeter as described above, there appears temporarily such a state that the fluid temperature when the heat-exchange with the fluid temperature detecting unit is carried out is different from the fluid temperature when the heat-exchange with the fluid flow rate detecting unit is carried out. Therefore, accurate temperature compensation cannot be performed and thus the precision of the fluid flow rate detection is reduced.

Therefore, the present invention has an object to provide a flowmeter which can accurately make a fluid temperature compensation and thus perform accurate flow rate detection even when the temperature of fluid flowing into the flowmeter quickly varies.

SUMMARY OF THE INVENTION

In order to attain the above objects, according to the present invention, there is provided a flowmeter having an indirectly heated type flow rate sensor unit in which a flow rate detector containing a heating element and a temperature sensing element for flow rate detection is joined to a heat transfer member for flow rate detection, a fluid flow rate value being achieved with calibration curves on the basis of the output of a detection circuit using a bridge circuit containing the temperature sensing element for flow rate detection as a constituent resistor, characterized in that the bridge circuit includes circuit characteristic value variation driving means for varying the circuit characteristic value thereof in plural steps, plural calibration curves are provided in association with the respective steps of the circuit characteristic value, any one of the plural calibration curves is selected in conformity with the step of the circuit characteristic value selected by the circuit characteristic value variation driving means, a fluid flow rate range to be measured is set every calibration curve, the overall measurement flow rate range is covered by the plural fluid flow rate ranges, and the circuit characteristic value variation driving means is controlled in accordance with the fluid flow rate value achieved to use one of the calibration curves corresponding to the flow rate range to which the flow rate value belongs.

In an aspect of the present invention, the respective neighboring flow rate ranges are partially overlapped with each other, and the selective switching from one of the two calibration curves corresponding to the two partially-overlapped flow rate ranges to the other calibration curve is carried out at the end portion of the one flow rate range.

In an aspect of the present invention, the flow rate sensor unit has a fluid temperature detector containing a fluid temperature detecting temperature sensing element and a fluid temperature detecting heat transfer member joined to the fluid temperature detector, and the bridge circuit contains the fluid temperature detecting temperature sensing element as a constituent resistor.

In an aspect of the present invention, the circuit characteristic value variation driving means is a multiplexer for selectively connecting an output terminal of the bridge circuit to any one of connection terminals between any two neighboring resistors of plural resistors which are provided to said bridge circuit so as to be connected to one another in series.

In an aspect of the present invention, the circuit characteristic value variation driving means carries out a switch-ON/OFF operation of switches of a bypass which are connected in parallel to at least one of plural resistors which are provided to the bridge circuit so as to be connected in series to one another. In an aspect of the present invention, each of the switches comprises a field effect transistor.

In order to attain the above objects, according to the present invention, there is provided a thermal type flowmeter having a heating element and a flow rate detection circuit containing a temperature sensing element for flow rate detection disposed so as to be affected by the heating of the heating element and perform heat transfer from/to fluid, the heating of the heating element being controlled on the basis of a voltage applied to the heating element, the applied voltage to the heating element being controlled on the basis of the output of the flow rate detection circuit and the flow rate of the fluid being measured on the basis of the applied voltage, characterized in that the applied voltage to the heating element is equal to the total voltage of a base voltage the value of which is set every predetermined time period and invariable within each predetermined time period, and an addition voltage which has a fixed value and is variable in voltage applying time, a comparator for comparing the output of the flow rate detecting circuit with a reference value is provided to output a binary signal having a first level indicating that the heating of the temperature sensing element is insufficient and a second level indicating the other cases, the binary signal output from the comparator is sampled at a predetermined period to count the appearance frequency of the first level every predetermined time period and achieve the count value thereof every predetermined time period, the base voltage is adjusted so that when the count value is within a predetermined range, the value of the base voltage in a subsequent predetermined time period is not changed, when the count value is larger than the upper limit of the predetermined range, the value of the base voltage in the subsequent predetermined time period is increased by a predetermined step value and when the count value is smaller than the lower limit of the predetermined range, the value of the base voltage in the subsequent time period is reduced by the predetermined step value, and the addition voltage is applied during only a time period when the binary signal output from the comparator has the first level.

In an aspect of the present invention, the addition voltage is set to two times to four times of the step value of the base voltage. In an aspect of the present invention, the predetermined range of the count value has a lower limit value which is smaller than a half of the sampling frequency within the predetermined time period and larger than zero, and has an upper limit value which is larger than a half of the sampling frequency within the predetermined time period and smaller than the sampling frequency.

In order to attain the above objects, according to the present invention, there is provided a thermal type flowmeter having a heating element and a flow rate detection circuit containing a temperature sensing element for flow rate detection disposed so as to be affected by the heating of the heating element and perform heat transfer from/to fluid, the heating of the heating element being controlled on the basis of a voltage applied to the heating element, the applied voltage to the heating element being controlled on the basis of the output of the flow rate detection circuit and the flow rate of the fluid being measured on the basis of the applied voltage, characterized in that the applied voltage to the heating element is equal to the total voltage of a base voltage the value of which is set every predetermined time period and invariable within each predetermined time period, and an addition voltage which has a fixed value and is variable in voltage applying time, a comparator for comparing the output of the flow rate detecting circuit with a reference value is provided to output a binary signal having a first level indicating that the heating of the temperature sensing element is insufficient and a second level indicating the other cases, the binary signal output from the comparator is sampled at a predetermined period to count the appearance frequency of the first level every predetermined time period and achieve the count value thereof every predetermined time period, the base voltage is adjusted so that when the count value is within a predetermined range, the value of the base voltage in a subsequent predetermined time period is not changed, when the count value is larger than the upper limit of the predetermined range, the value of the base voltage in the subsequent predetermined time period is increased by a predetermined step value and when the count value is smaller than the lower limit of the predetermined range, the value of the base voltage in the subsequent time period is reduced by the predetermined step value, the addition voltage is applied during only a time period when the binary signal output from the comparator has the first level, and a data interpolating calculation is made by using an instantaneous flow rate converting table comprising plural individual calibration curves which indicate the relationship between the applied voltage to the heating element and the instantaneous flow rate every discrete temperature value, thereby achieving an instantaneous flow rate value at an environmental temperature.

In an aspect of the present invention, the individual calibration curves are created for discrete values of possible values of the voltage to be applied to the heating element, and when the instantaneous flow rate value is achieved, a data interpolation calculation is carried out to achieve the instantaneous flow rate value corresponding to a voltage value applied to the heating element. In an aspect of the present invention, the discrete values are set to the minimum values of values having the same high-order bit values of possible digital values of the voltage to be applied to the heating element, and when the data interpolation calculation is carried out, the instantaneous flow rate values corresponding to first discrete values having the same high-order bit values as the voltage value applied to the heating element and second discrete values whose high-order bit values are larger than that of the voltage value applied to the heating element by 1 are achieved by the individual calibration curves.

In an aspect of the present invention, the addition voltage is set to two times to four times of the step value of the base voltage. In an aspect of the present invention, the predetermined range of the count value has a lower limit value which is smaller than a half of the sampling frequency within the predetermined time period and larger than zero, and has an upper limit value which is larger than a half of the sampling frequency within the predetermined time period and smaller than the sampling frequency.

In order to attain the above objects, according to the present invention, there is provided a flowmeter having an indirectly heated type flow rate sensor unit in which a flow rate detector containing a heating element and a temperature sensing element for flow rate detection is joined to a heat transfer member for flow rate detection, a fluid flow rate value being achieved with a calibration curve on the basis of the output of a detection circuit containing the temperature sensing element for flow rate detection, characterized in that the calibration curve comprises three portions corresponding to three areas of the output value of the detection circuit, and the three portions are represented by quaternary functions which use the output of the detection circuit as variables and are different in coefficient, a fluid flow rate value being achieved by using the portion of the calibration curve which corresponds to the area to which the output value of said detection circuit belongs.

In an aspect of the present invention, the calibration curve is represented as follows:

$$f=a_1v^4+b_1v^3+c_1v^2+d_1v+e_1 (0 \leq v < v_1)$$

$$f=a_2v^4+b_2v^3+c_2v^2+d_2v+e_2 (v_1 \leq v < v_2)$$

$$f=a_3v^4+b_3v^3+c_3v^2+d_3v+e_3 (v_2 \leq v)$$

wherein f represents the fluid flow rate, v represents the output of the detection circuit, and $a_1, b_1, c_1, d_1, e_1; a_2, b_2, c_2, d_2, e_2; a_3, b_3, C_3, d_3, e_3$ represent coefficients.

In an aspect of the present invention, the detection circuit comprises a bridge circuit. In an aspect of the present invention, the flow rate sensor unit has a fluid temperature detector containing a fluid temperature detecting temperature sensing element and a fluid temperature detecting heat transfer member joined to the fluid temperature detector, and the detection circuit contains the fluid temperature detecting temperature sensing element.

In order to attain the above objects, according to the present invention, there is provided a thermal type flowmeter which includes a casing member having a fluid flow passage extending from a fluid flow-in port to a fluid flow-out port, a flow rate detecting unit which is secured to the casing member and varies in electrical characteristic value in accordance with the flow of the fluid in the fluid flow passage through the heat exchange between the flow rate detecting unit and the fluid in the fluid flow passage, and a fluid temperature detecting unit which is secured to the casing member and varies in electrical characteristic value in accordance with the temperature of the fluid through the heat exchange between the fluid temperature detecting unit and the fluid in the fluid flow passage, the flow rate of the fluid being also detected on the basis of the electrical characteristic value of the fluid temperature detecting unit, characterized in that a fluid residence area is formed at the upstream side, with respect to the flow of the fluid, of each of the position at which the heat exchange between the flow rate detecting unit and the fluid is carried out and the position at which the heat exchange between the fluid temperature detecting unit and the fluid is carried out, the fluid residence area having a flow cross section which is five times or more, preferably ten times or more, as large as the flow cross section at the position where the heat exchange between the flow rate detecting unit and the fluid is carried out or at the position where the heat exchange between the fluid temperature detecting unit and the fluid is carried out.

In order to attain the above objects, according to the present invention, there is provided a thermal type flowmeter which includes a casing member having a fluid flow passage extending from a fluid flow-in port to a fluid flow-out port, a flow rate detecting unit which is secured to the casing member and varies in electrical characteristic value in accordance with the flow of the fluid in the fluid flow passage through the heat exchange between the flow rate detecting unit and the fluid in the fluid flow passage, and a fluid temperature detecting unit which is secured to the casing member and varies in electrical characteristic value in accordance with the temperature of the fluid through the heat exchange between the fluid temperature detecting unit and the fluid in the fluid flow passage, a fluid-temperature-compensated flow rate of the fluid being detected by a detection circuit containing the flow rate detecting unit and the fluid temperature detecting unit, characterized in that a fluid residence area is formed at the upstream side, with respect to the flow of the fluid, of each of the position at which the heat exchange between the flow rate detecting unit and the fluid is carried out and the position at which the heat exchange between the fluid temperature detecting unit and the fluid is carried out, the flow velocity of the fluid at the fluid residence area being equal to $1/5$ or less, preferably $1/10$ or less, of the flow velocity of the fluid at the position where the heat exchange between the flow rate detecting unit and the fluid is carried out or at the position where the heat exchange between the fluid temperature detecting unit and the fluid is carried out.

In an aspect of the present invention, the volume of the fluid residence area is 50 times or more as large as the volume per unit length of the fluid flow passage in the fluid flow direction at the position where the heat exchange between the flow rate detecting unit and the fluid is carried out or at the position where the fluid temperature detecting unit and the fluid is carried out.

In an aspect of the present invention, the fluid flow passage comprises a first flow passage part intercommunicating with the fluid flow-in port, and a second flow passage part intercommunicating with the fluid flow-out port, at which the heat exchange between the flow rate detecting unit and the fluid is carried out and the heat exchange between the fluid temperature detecting unit and the fluid is carried out, the fluid residence area is located between the first flow passage part and the second flow passage part, and the flow cross section of the first flow passage part is smaller than the flow cross section of the fluid residence area.

In an aspect of the present invention, the second flow passage part has a part extending in parallel to the fluid residence area at the position where the heat exchange between the flow rate detecting unit and the fluid is carried out and at the position where the heat exchange between the fluid temperature detecting unit and the fluid is carried out.

In an aspect of the present invention, a filter is interposed at the intercommunication portion between the fluid residence area and the second flow passage part. In an aspect of the present invention, the casing member is formed of metal. In an aspect of the present invention, the flow rate detecting unit is designed so that a heating element, a flow rate detecting temperature sensing element and a flow rate detecting heat transfer member extending into the fluid flow passage are arranged so as to perform heat transfer thereamong, and the fluid temperature detecting unit is designed so that a fluid temperature detecting temperature sensing element and a fluid temperature detecting heat transfer member extending into the fluid flow passage are arranged so as to perform heat transfer therebetween.

BRIEF DESCRIPTION OF THE DRAWINGS

FIGS. 3A and 3B are schematic cross-sectional views showing a flow rate sensor unit of the embodiment of the flowmeter according to the present invention;

FIG. 4 is a perspective view showing the flow rate sensor unit of the embodiment of the flowmeter according to the present invention;

FIG. 27 is a front view showing the embodiment of the flowmeter according to the present invention;

FIG. 28 is a right side view showing the embodiment of the flowmeter according to the present invention;

FIG. 29 is a bottom view of the embodiment of the flowmeter according to the present invention when a lid member is removed;

DETAILED DESCRIPTION OF THE PREFERRED EMBODIMENTS

Preferred embodiments according to the present invention will be described hereunder with reference to the accompanying drawings.

Figure 1:
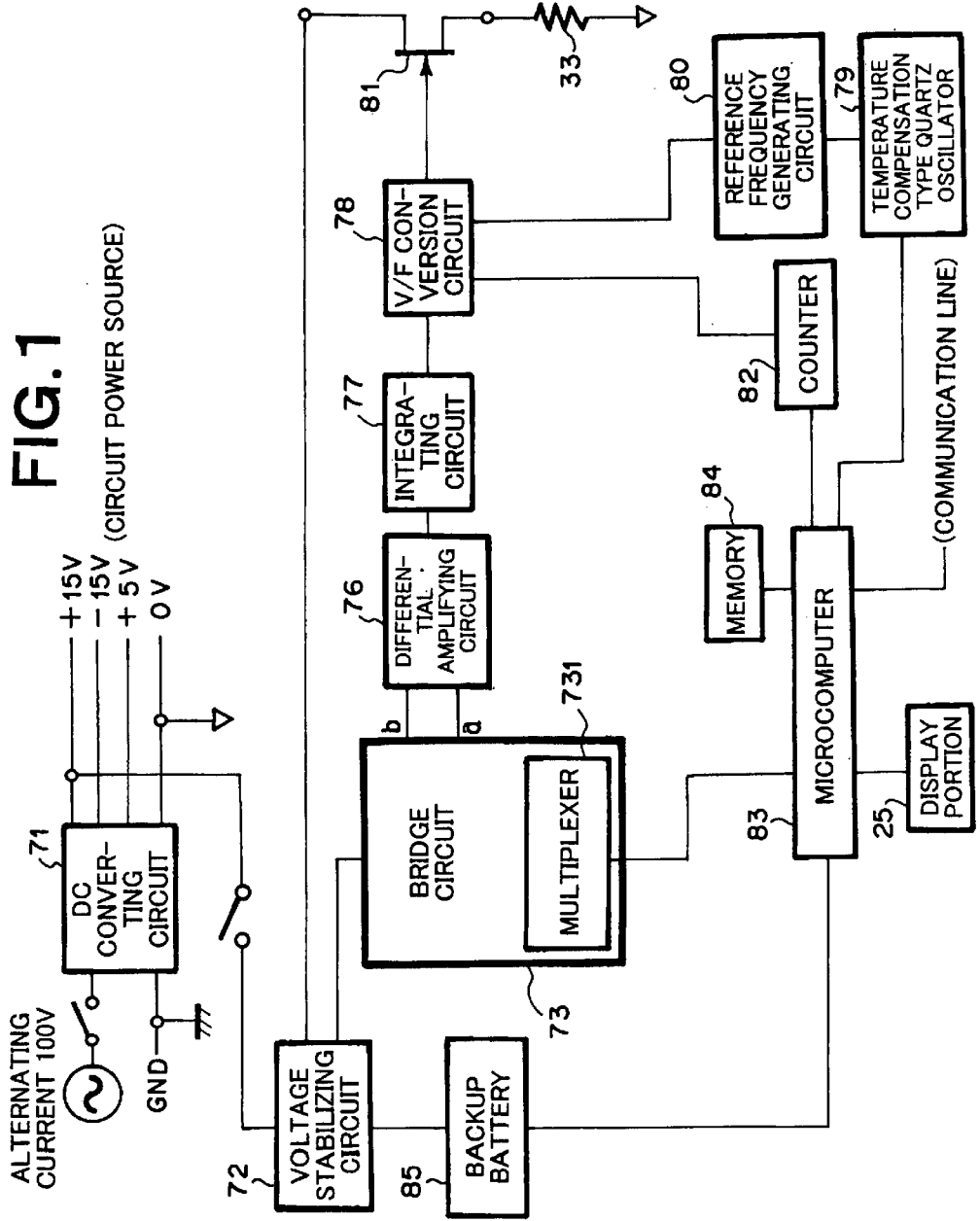
FIG. 1 is a circuit diagram showing an embodiment of a flowmeter according to the present invention.
Figure 2:
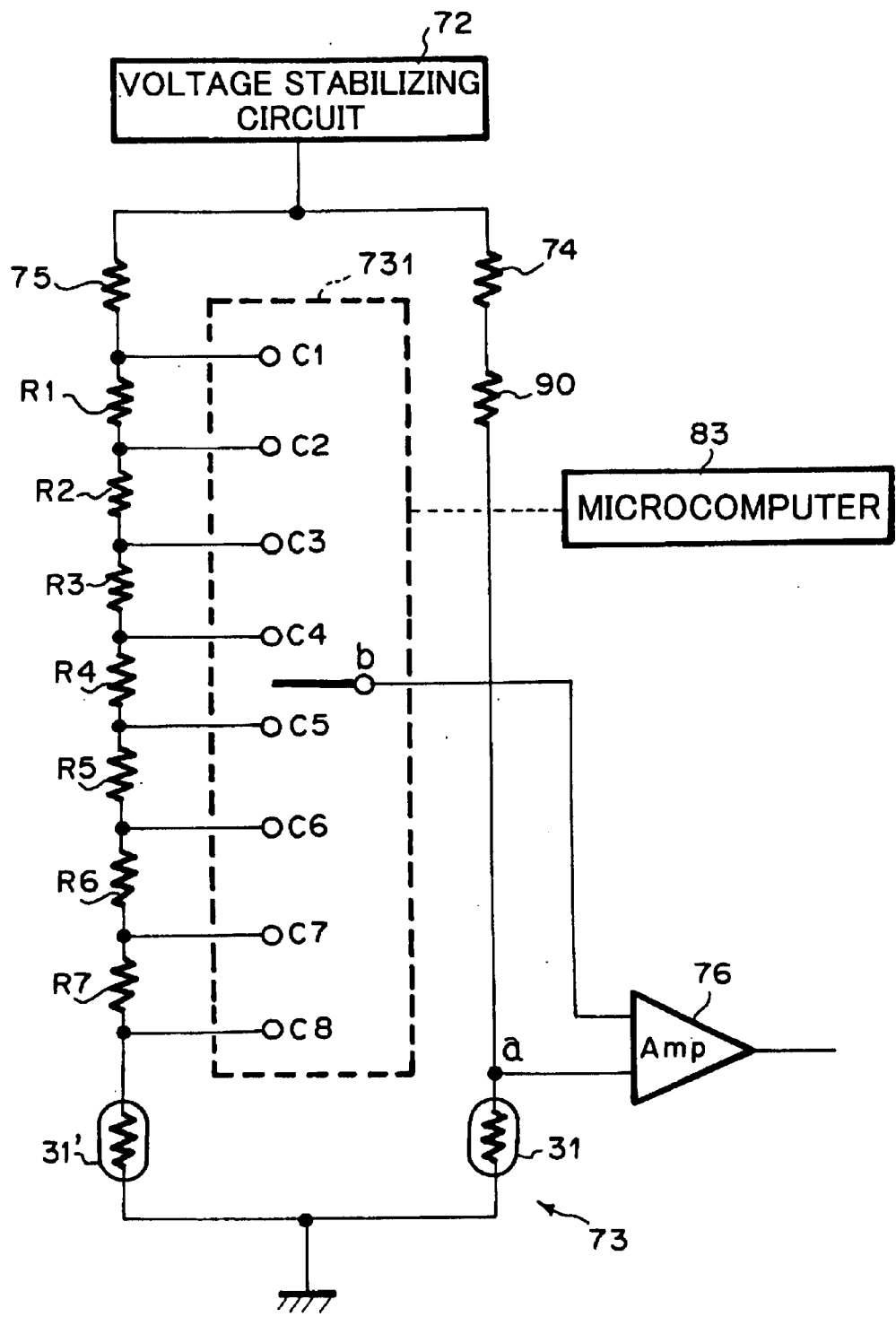
FIG. 2 is a diagram showing a part of the construction of the embodiment of the flowmeter according to the present invention.
Figure 5A:
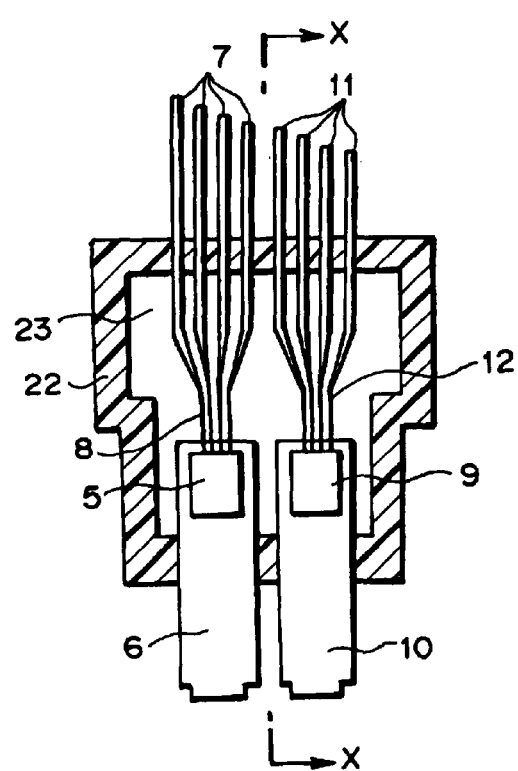
FIGS. 5A and 5B are schematic cross-sectional views showing a modification of the flow rate sensor unit shown in FIGS. 3A and 3B.
Figure 5B:
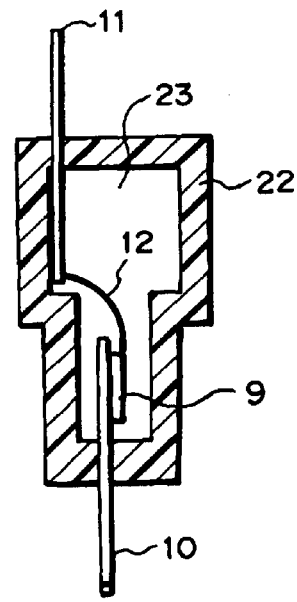
Figure 6:
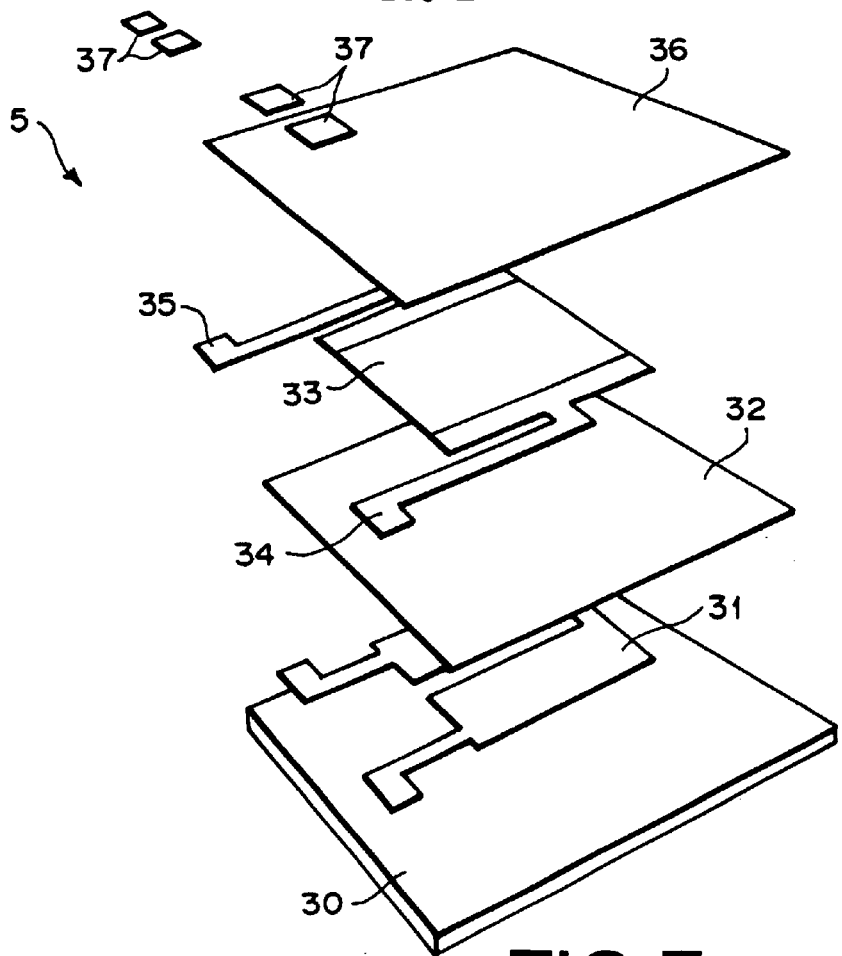
FIG. 6 is an exploded perspective view showing the construction of a flow rate detector.
Figure 7:
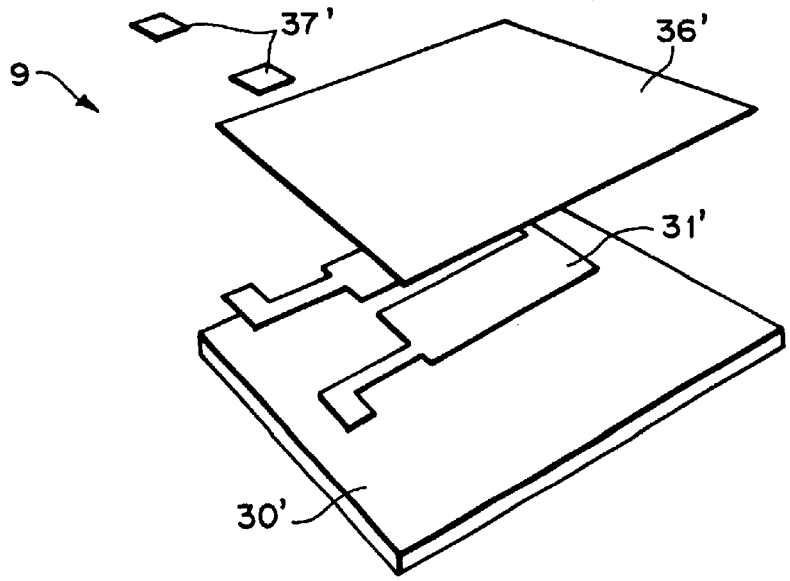
FIG. 7 is an exploded perspective view showing the construction of a fluid temperature detector.

FIG. 1 is a diagram showing the circuit construction of an embodiment of a flowmeter according to the present invention, and FIG. 2 is a diagram showing a partial construction of the flowmeter of FIG. 1. FIGS. 3A and 3B are schematic cross-sectional views showing a flow rate sensor unit according to the embodiment, wherein FIG. 3A shows a state that the flowmeter is secured to a flow passage member having a fluid flow passage, and FIG. 3B is a cross-sectional view taken along X—X of the flow rate sensor unit of FIG. 3A. FIG. 4 is a perspective view showing the flow rate sensor unit of the embodiment. FIGS. 5A and 5B are schematic cross-sectional views showing a modification of the flow rate sensor unit shown in FIGS. 3A and 3B, wherein FIG. 5B is a cross-sectional view taken along X—X of FIG. 5A. FIG. 6 is an exploded perspective view showing the construction of a flow rate detector, and FIG. 7 is an exploded perspective view showing the construction of a fluid temperature detector.

First, the construction of a flow rate sensor unit according to this embodiment will be described with reference to FIGS. 3A to 7. As shown in FIGS. 3A and 3B, a flow rate detector 5 is joined to the surface of a fin plate 6 serving as a heat transfer member for flow rate detection, and a fluid temperature detector 9 is joined to the surface of a fin plate 10 serving as a heat transfer member for fluid temperature detection. The flow rate detector 5, the fluid temperature detector 9 and parts of the fin plates 6, 10 are accommodated in a housing 2.

As shown in FIG. 6, the flow rate detector 5 is designed in the form of a chip by laminating, in the following order, a thin-film temperature sensing element 31 for flow rate detection, an interlayer insulating film 32, a thin-film heating element 33 with its electrodes 34, 35 and a protection film 36 on a rectangular substrate of about 0.4 mm in thickness and about 2 mm in square formed of silicon, alumina or the like and then forming a pad layer 37 so that the bonding portion of the thin-film temperature sensing element 31 for flow rate detection and the heating element electrodes 34, 35 are covered by the pad layer 37.

As the thin-film temperature sensing element 31 may be used a metal resistance film having a high and stable temperature coefficient such as platinum (Pt), nickel (Ni) or the like which is patterned to have a thickness of about 0.5 to 1 μm and have a desired shape, for example, a meandering shape. Alternatively, a manganese oxide-based NTC thermistor or the like may be used. Each of the interlayer insulating film 32 and the protection film 36 may be formed of $SiO_2$ and have a thickness of about 1 μm. As the thin-film heating element 33 may be used a resistor patterned to have a thickness of about 1 μm and have a desired shape, which is formed of Ni, Ni—Cr, Pt or cermet such as Ta—$SiO_2$, Nb—$SiO_2$ or the like. The heating element electrode 34, 35 may be formed of a Ni thin film having a thickness of about 1 μm, or both of a Ni thin film of about 1 μm in thickness and a gold (Au) thin film of about 0.5 μm laminated on the Ni thin film. As the pad layer 37 may be used an Au thin film or Pt thin film of 0.2 mm×0.15 mm in area and about 0.1 μm in thickness.

As shown in FIG. 7, the fluid temperature detector 9 has substantially the same construction as the flow rate detector 5 except that the heating element 33, etc. are removed from the construction of the flow rate detector 5, that is, a thin-film temperature sensing element 31' for fluid temperature detection similar to the thin-film temperature sensing element 31 for fluid temperature detection and a protection film 36' similar to the protection film 36 are laminated in this order on a substrate 30' similar to the substrate 30, and also a pad layer 37' is formed so as to cover the bonding portion of the thin-film temperature sensing element 31' for fluid temperature detection, thereby finally achieving the fluid temperature detector 9 as a chip.

One surface of the fin plate 6 (10) at one end portion thereof is joined to the surface of the flow rate detector 5 (the fluid temperature detector 9) at the substrate 30 (30') side thereof through a joint member having excellent thermal conductivity. The fin plate 6, 10 may comprise a rectangular plate of about 0.2 mm in thickness and about 2 mm in width which is formed of copper, duralumin, copper-tungsten alloy or the like. Silver paste may be used as the joint member.

As shown in FIGS. 3A and 3B, the housing 2 of the sensor unit is accommodated in a sensor unit arrangement portion formed in the flow passage member 14, and the other end portions of the fin plates 6, 10 extend into the fluid flow passage 13 formed in the fluid flow passage member 14. The fin plates 6, 10 extend to pass through the center of the cross section in the fluid flow passage 13 having a substantially circular cross section. The fin plates 6, 10 are arranged along the flow direction (indicated by an arrow in FIG. 1) of the fluid in the fluid flow passage 13, so that the heat exchange between the fluid and each of the flow rate detector 5 and the fluid temperature detector 9 can be excellently carried out without greatly disturbing the fluid flow.

The housing 2 and the fluid flow passage member 14 may be formed of synthetic resin. The respective electrode terminals (pads) of the flow rate detector 5 and the fluid temperature detector 9 are connected to the inner lead portions (the in-housing portions) of the respective leads 7, 11 by Au wires 8, 12. Each of the leads 7, 11 extend to the outside of the housing 2 so as to be partially exposed to the outside, thereby forming an outer lead portion.

In FIGS. 3A and 3B, the flow rate detector 5, the fluid temperature detector 9, parts of the fin plates 6, 10 and the inner lead portions are sealingly accommodated in the housing 2 by resin filling. However, a space 23 may be formed in the housing 22 as shown in a modification of FIGS. 5A and 5B.

Next, the circuit construction of the flowmeter of this embodiment having the sensor unit as described above will be described with reference to FIGS. 1 and 2.

As shown in FIG. 1, alternating power of 100V is used as a power supply source, and DC voltages of +15V, −15V and +5V are output from a DC converting circuit 71 by using the alternating power of 100V. The DC voltage of +15V output from the DC converting circuit 71 is input to a voltage stabilizing circuit 72.

The stabilized DC voltage supplied from the voltage stabilizing circuit 72 is supplied to a bridge circuit 73. As shown in FIG. 2, the bridge circuit 73 contains the temperature sensing element 31 for flow rate detection and resistors 74, 90 which are connected to one another in series, and the temperature sensing element 31' for temperature compensation and resistors 75, R1 to R7 which are connected to one another in series. The bridge circuit 73 is equipped with a multiplexer 731 serving as circuit characteristic value variation driving means, and the multiplexer 731 selectively connects the connection terminal b to one of the connection terminals c1 to c8 each of which is connected to a point between the respective two neighboring resistors of the resistors 75, R1 to R7. The characteristic value of the bridge circuit 73 can be varied in plural steps by the selection of any one of the connection terminals 1 to c8. The potential Va, Vb at the point a, b of the bridge circuit 73 is input to a differential amplifying circuit 76 of variable amplification factor. The output of the differential amplifying circuit 76 is input to an integrating circuit 77.

The output of the voltage stabilizing circuit 72 is supplied to the thin-film heating element 33 through a field effect transistor 81 for controlling the current to be supplied to the thin-film heating element 33. That is, in the flow rate detector 5, the thin-film temperature sensing element 31 executes the temperature sensing (detecting) operation on the basis of the heating of the thin-film heating element 33 with being affected by the endothermic action of fluid to be detected through the fin plate 6. As the result of the temperature sensing operation is achieved the difference between the potential Va at the point of a and the potential Vb at the point of b in the bridge circuit 73 shown in FIG. 2.

The value of (Va-Vb) is varied due to variation of the temperature of the temperature sensing element 31 for flow rate detection and the thin-film temperature sensing element 31' for fluid temperature detection in accordance with the flow rate of the fluid. The value (Va-Vb) may be set to zero at a different fluid flow rate in accordance with selection of one of the terminals c1 to c8 to be connected to the terminal b by the multiplexer 731. At these flow rates, the output of the differential amplifying circuit 76 is equal to zero, and thus the output of the integrating circuit 77 is equal to a fixed value.

The output of the integrating circuit 77 is input to a V/F converting circuit 78 to form a pulse signal having the frequency (for example, $5 \times 10^{-5}$ at maximum) corresponding to the voltage signal. The pulse signal has a fixed pulse width (time width) (for example, a desired value from 1 to 10 microseconds). For example, when the output of the integrating circuit 77 is equal to 1V, a pulse signal having a frequency of 0.5 kHz is output. When the output of the integrating circuit 77 is equal to 4V, a pulse signal having a frequency of 2 kHz is output. The bridge circuit 73, the differential amplifying circuit 76, the integrating circuit 77 and the V/F converting circuit 78 constitute the detection circuit.

The output of the V/F converting circuit 77 is supplied to the gate of a transistor 81, and current is supplied to the thin-film heating element 33 through the transistor 81 the gate of which is supplied with the pulse signal. Accordingly, the thin-film heating element 33 is supplied with a divided voltage of the output voltage of the voltage stabilizing circuit 72 through the transistor 81 in the form of a pulse at the frequency corresponding to the output value of the integrating circuit 77, so that the current flows through the thin-film heating element 33 intermittently to thereby heat the thin-film heating element 33. The frequency of the V/F converting circuit 77 is set on the basis of high-precision clocks which are set on the basis of oscillation of a temperature-compensated type quartz oscillator 79.

The pulse signal output from the V/F converting circuit 77 is counted by a pulse counter 82. A microcomputer 83 converts the pulse count result (pulse frequency) to the corresponding flow rate (instantaneous flow rate) on the basis of a reference frequency generated in a reference frequency generating circuit 80, and integrates the flow rate thus achieved with respect to the time, thereby calculating an integrated flow rate.

The selection of the connection between the connection terminal b and one of the connection terminals c1 to c8 through the multiplexer 731 is controlled by the microcomputer 83 as shown in FIG. 2. The selection of the connection terminals c1 to c8 by the microcomputer 83 and the conversion to the flow rate are performed as follows.

Figure 8:
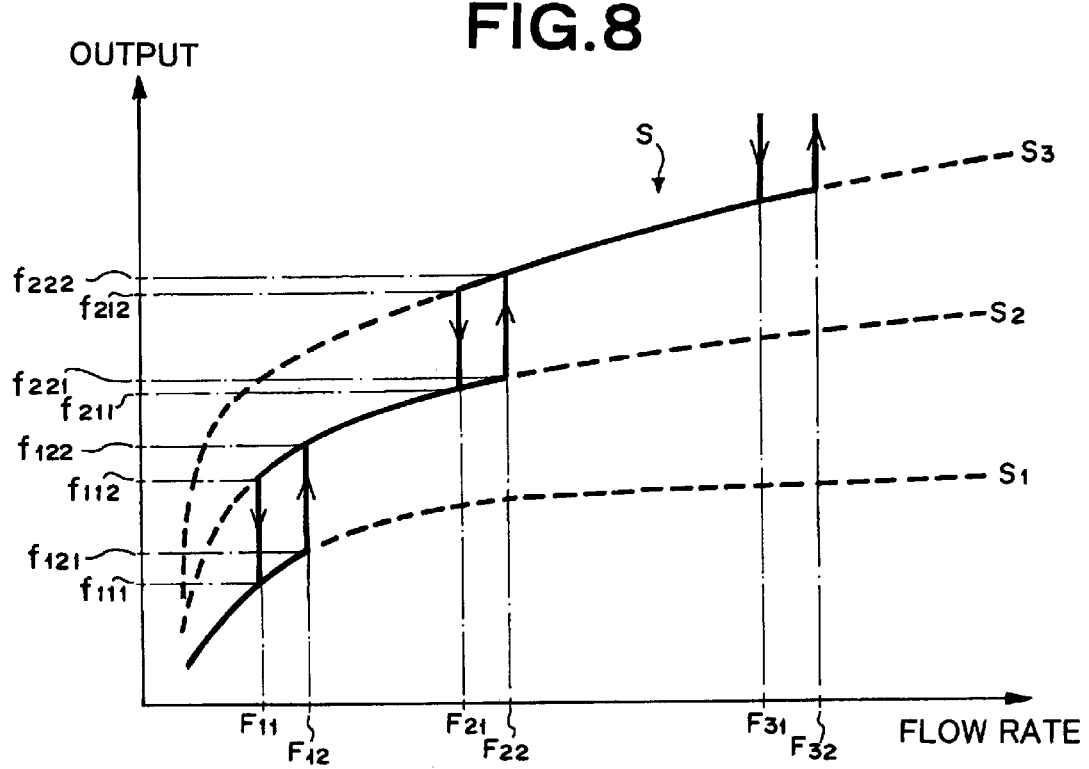
FIG. 8 is a diagram showing an example of calibration curves in the flowmeter of the present invention.

That is, calibration curves for the conversion to the flow rate are stored in a memory 84. FIG. 8 shows examples of the calibration curves. These calibration curves contain $S_1$, $S_2$, $S_3$, . . . , and these calibration curves are used in association with the circuit characteristic value steps when the connection terminals $c_1$, $c_2$, $c_3$, . . . are selected by the multiplexer 731, respectively. The calibration curves $S_1$, $S_2$, $S_3$, . . . constitute a data table achieved by selectively connecting the connection terminal b and each of the connection terminals $c_1$, $c_2$, $c_3$, . . . and, under this state, measuring the output (pulse frequency) of the pulse counter 82 every actual flow rate of the fluid.

In FIG. 8, the calibration curve $S_1$ is mainly used when the connection terminal c1 of the multiplexer 731 is selected to measure a flow rate range from 0 to $F_{12}$, $S_2$ is mainly used when the connection terminal c2 of the multiplexer 731 is selected to measure a flow rate range from $F_{11}$ to $F_{22}$, $S_3$ is mainly used when the connection terminal c3 of the multiplexer 731 is selected to measure a flow rate range from $F_{21}$ to $F_{32}$, and so forth. Here, as shown in FIG. 8, $F_{11} < F_{12} < F_{21} < F_{22} < F_{31} < F_{32}$, and the flow rate value $F_{11}$ corresponds to the output values $f_{111}$, $f_{112}$ of the calibration curves $S_1$, $S_2$ respectively, the flow rate value $F_{12}$ corresponds to the output values $f_{121}$, $f_{122}$ of the calibration curves $S_1$, $S_2$ respectively, the flow rate value $F_{21}$ corresponds to the output values $f_{211}$, $f_{212}$ of the calibration curves $S_2$, $S_3$ respectively, the flow rate value $F_{22}$ corresponds to the output values $f_{221}$, $f_{222}$ of the calibration curves $S_2$, $S_3$ respectively, and so forth. That is, the neighboring flow rate ranges are partially overlapped with each other, and the overall measuring flow rate range is covered by these flow rate ranges.

The microcomputer 83 first instructs the multiplexer 731 to select a connection terminal cn to measure a certain flow rate range [for example, makes an instruction to select the connection terminal c2 to measure the flow rate range from $F_{11}$ to $F_{22}$] when the flow rate of the fluid to be detected is measured. Thereafter, the pulse frequency achieved from the counter 82 is converted to the flow rate by using a calibration curve $S_n$ [for example, the calibration curve $S_2$]. When the flow rate value thus achieved is within the flow rate range corresponding to the selected connection terminal cn [for example, from $F_{11}$ to $F_{22}$], the selection of the connection terminal cn [for example, c2] by the multiplexer 731 is kept.

On the other hand, when the flow rate value achieved is out of the flow rate range corresponding to the selected connection terminal cn [out of the range from $F_{11}$ to $F_{22}$], the microcomputer instructs the multiplexer 731 to select the connection terminal cm [for example, c3] in order to measure the flow rate range [for example, from $F_{21}$ to $F_{32}$] to which the flow rate value achieved belongs. Likewise, the pulse frequency achieved from the counter 82 is converted to the flow rate by using a calibration curve $S_m$ [for example, $S_3$]. When the flow rate value thus achieved is within the flow rate range [for example, from $F_{21}$ to $F_{32}$] corresponding to the selected connection terminal cm, the selection of the connection terminal cm by the multiplexer 731 is kept. On the other hand, when the flow rate value thus achieved is out of the flow rate range [for example, from $F_{21}$ to $F_{32}$] corresponding to the selected connection terminal cm, the microcomputer instructs the multiplexer 731 to select a connection terminal to measure a flow rate range to which the flow rate value thus achieved belongs.

Likewise, on the basis of the measured flow rate value achieved, the microcomputer 83 controls the multiplexer 731 to achieve a bridge circuit characteristic required to measure the flow rate value concerned at all times (specifically, select one of the connection terminals), and performs the flow rate value measurement based on a proper calibration curve.

When some variation occurs in the flow rate while the flow rate is measured and thus the flow rate is out of the flow rate range corresponding to the selected calibration curve, the selection of the current calibration curve is switched to the calibration curve corresponding to a flow rate range which is adjacent to and partially overlapped with the current flow rate range (the selection of the connection terminal is switched under the control of the multiplexer 731). Accordingly, the selective switching between the calibration curves for the neighboring flow rate ranges is carried out with directionality at the end portion of each flow rate range (for example, only the switching from the calibration curve $S_3$ to the calibration curve $S_2$ is carried out at the flow rate value $F_{21}$, and only the switching from the calibration curve $S_2$ to the calibration curve $S_3$ is carried out at the flow rate value $F_{22}$) as shown in FIG. 8. With this setting, even when variation of the flow rate occurs in the neighborhood of the switching flow rate value occurs, it is unnecessary to selectively switch the calibration curve frequently, and thus stability of the measurement can be kept.

As shown in FIG. 8, each of the calibration curves has a moderate slope (the rate of variation of the output pulse frequency to variation of the flow rate) in the flow rate range in which the calibration curve is mainly used, and the moderate flow rate variation with respect to the output variation can be implemented. Accordingly, in the flowmeter of this embodiment which is controlled to use the calibration curve S (indicated by a solid line in FIG. 8) constructed by predetermined respective flow rate range portions of the calibration curves, the flow rate measurement can be performed in a broad flow rate range with excellent precision.

When the flow rate of the fluid is increased/reduced, the output of the differential amplifying circuit 76 is varied in polarity (varied in accordance with the sign (positive or negative) of the resistance-temperature characteristic of the temperature sensing element 31 for flow rate detection) and magnitude in accordance with the value of (Va-Vb), and the output of the integrating circuit 77 is varied in accordance with this variation of the output of the differential amplifying circuit 76. The variation rate of the output of the integrating circuit 77 can be adjusted by setting the amplification factor of the differential amplifying circuit 76. The response characteristic of the control system is set by the integrating circuit 77 and the differential amplifying circuit 76.

When the fluid flow rate is increased, the temperature of the temperature sensing element 31 for flow rate detection is reduced. Therefore, such an output (higher voltage value) that the heating value of the thin-film heating element 33 is increased (that is, the pulse frequency is increased) can be achieved from the integrating circuit 77, and the bridge circuit 73 is set to the equilibrium state at the time point when the output of the integrating circuit is equal to the voltage value corresponding to the fluid flow rate.

On the other hand, when the fluid flow rate is reduced, the temperature of the temperature sensing element 31 for flow rate detection is increased. Therefore, such an output (lower voltage value) that the heating value of the thin-film heating element 33 is reduced (that is, the pulse frequency is reduced) can be achieved from the integrating circuit 77, and the bridge circuit 73 is set to the equilibrium state at the time point when the output of the integrating circuit 77 is equal to the voltage corresponding to the fluid flow rate.

That is, in the control system of this embodiment, the frequency (corresponding to the heating value) of the pulse current to be supplied to the thin-film heating element 33 is set so that the bridge circuit 73 is set to the equilibrium state, and implementation of the equilibrium state (the response of the control system) as described above can be performed within 0.1 second, for example.

Accordingly, according to the flowmeter of this embodiment, even when the flow rate value to be detected is varied in a broad range and thus it is deviated from each flow rate range, a proper bridge circuit characteristic conformed with the flow rate range to which the flow rate value to be detected belongs can be immediately set, so that the flow rate measurement can be performed with high precision on the basis of the bridge circuit characteristic thus set.

The instantaneous flow rate and the integrated flow rate thus achieved are displayed on a display portion 25, and also transmitted to the outside through a communication line comprising a telephone line or other networks. Further, the data of the instantaneous flow rate and the integrated flow rate may be stored in the memory 84 if necessary.

In FIG. 1, reference numeral 85 represents a backup battery (for example, cell).

According to the above-described embodiment, the pulse signal generated in the V/F conversion circuit 78 is used to measure the flow rate, and it is easy to sufficiently reduce the error of the pulse signal due to the temperature variation. Therefore, the errors of the flow rate value and the integrated flow rate value achieved on the basis of the pulse frequency can be reduced. Further, according to this embodiment, the control of the current supply to the thin-film heating element 33 is performed by ON/OFF based on the pulse signal generated in the V/F converting circuit 78. Therefore, the probability that a control error due to the temperature variation occurs is extremely small.

Further, this embodiment uses a minute chip containing the thin-film heating element and the thin-film temperature sensing element as the flow rate detector, so that the high-speed response as described above can be implemented and the precision of the flow rate measurement is excellent.

Figure 9:
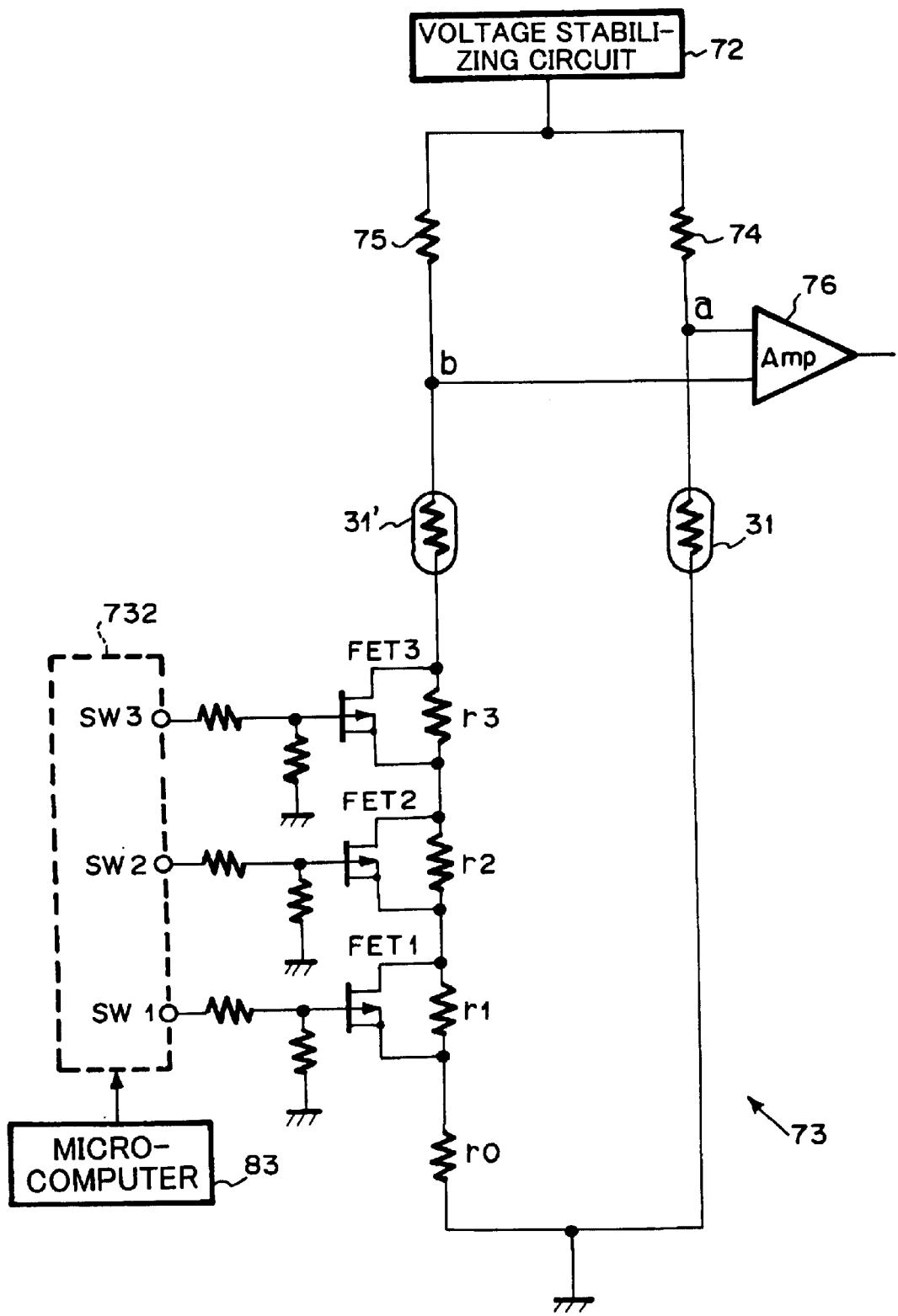
FIG. 9 is a partial circuit diagram showing another embodiment of the flowmeter according to the present invention.

FIG. 9 is a partial circuit diagram showing another embodiment of the flowmeter according to the present invention. In FIG. 9, the elements and parts having the same functions as shown in FIGS. 1 to 8 are represented by the same reference numerals. In this embodiment, the construction of the bridge circuit 73 containing the circuit characteristic value variation driving means is different from that of the embodiment shown in FIGS. 1 to 8, however, the other portions are substantially the same as the embodiment shown in FIGS. 1 to 8.

In this embodiment, the bridge circuit 73 contains the in-series connection between the temperature sensing element 31 for flow rate detection and the resistor 74 and the in-series connection between the temperature sensing element 31' for temperature compensation and resistors 75, r0 to r3. The circuit characteristic value variation driving means of this embodiment carries out the switch-on/off operation of a bypass containing field effect transistors FET1 to FET3 (switching means) which are respectively connected to the in-series connected resistors r1 to r3 of the bridge circuit in parallel. That is, switching signals from switching terminals SW1 to SW3 of a switching circuit 732 controlled by the microcomputer 83 are input to the gates of the field effect transistors FET1 to FET3, respectively. The field effect transistors FET1 to FET3 are designed so that the source-drain resistance values thereof under the switch-ON state are sufficiently lower than r1 to r3 (for example, several tens mΩ) and the source-drain resistance values thereof under the switch-OFF state are sufficiently higher than r1 to r3 (for example, several MΩ). Accordingly, the composite resistance value of the in-series connected portion of the resistors r0 to r3 with the bypass in the bridge circuit 73 is varied as shown in the following Table 1 in accordance with the ON (for example, 4V) or OFF (for example, 0V) state of the switching signals output from the switching terminals SW1 to SW3 when r0=10 Ω. r1=10 Ω, r2=20 Ω, r3=40 Ω.

TABLE 1

| SW3 | SW2 | SW1 | Composite resistance value of in-series connection portion r0 to r3 |
|---|---|---|---|
| ON | ON | ON | 10 Ω |
| ON | ON | OFF | 20 Ω |
| ON | OFF | ON | 30 Ω |
| ON | OFF | OFF | 40 Ω |
| OFF | ON | ON | 50 Ω |
| OFF | ON | OFF | 60 Ω |
| OFF | OFF | ON | 70 Ω |
| OFF | OFF | OFF | 80 Ω |

The combination of the switching signals output from the switching terminals SW1 to SW3 of the switching circuit 732 is controlled by the microcomputer 83 as described above to vary the characteristic value of the bridge circuit in plural steps as in the case of the embodiment shown in FIGS. 1 to 8, and the flow rate can be measured in the same manner.

Figure 10:
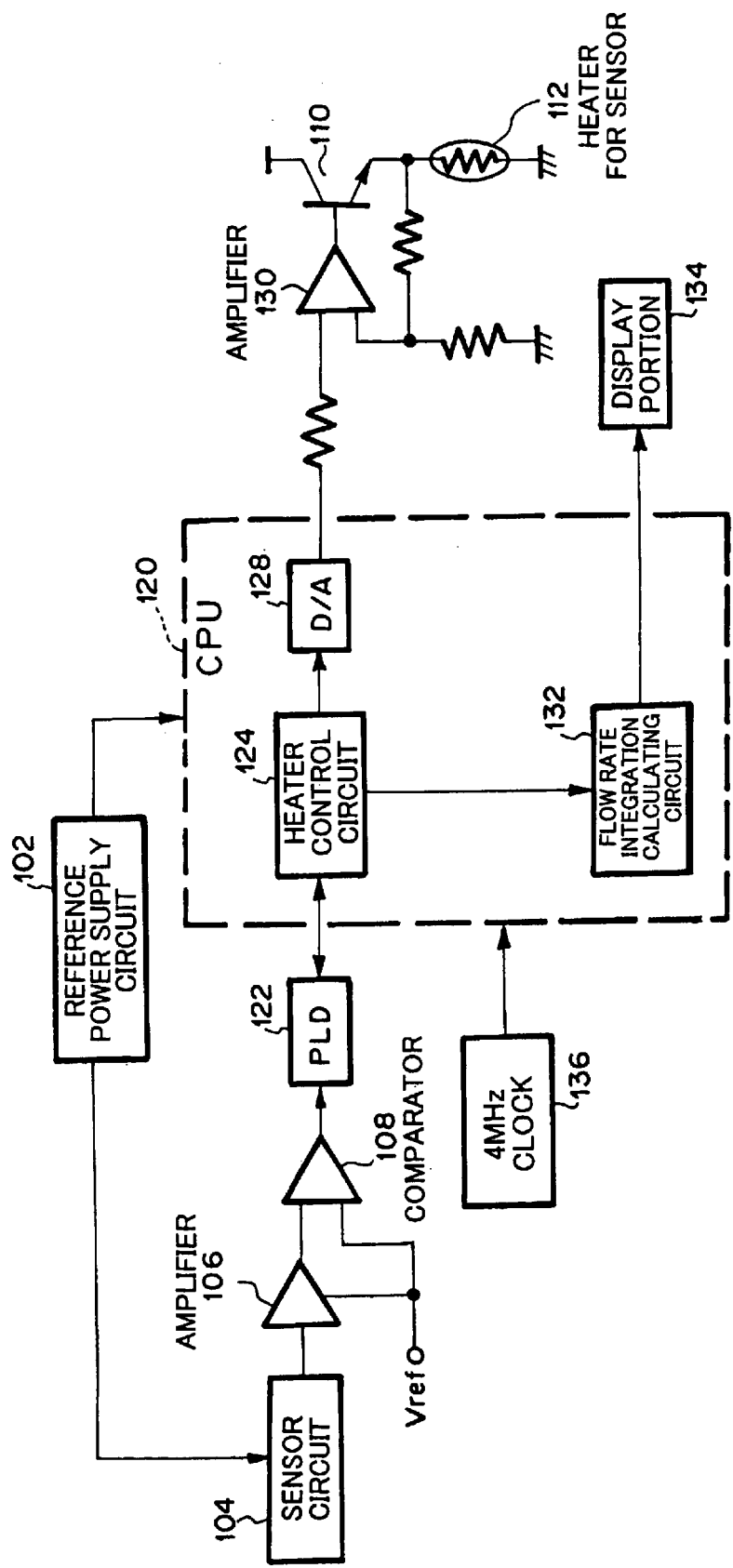
FIG. 10 is a circuit diagram showing an embodiment of the flowmeter according to the present invention.
Figure 11:
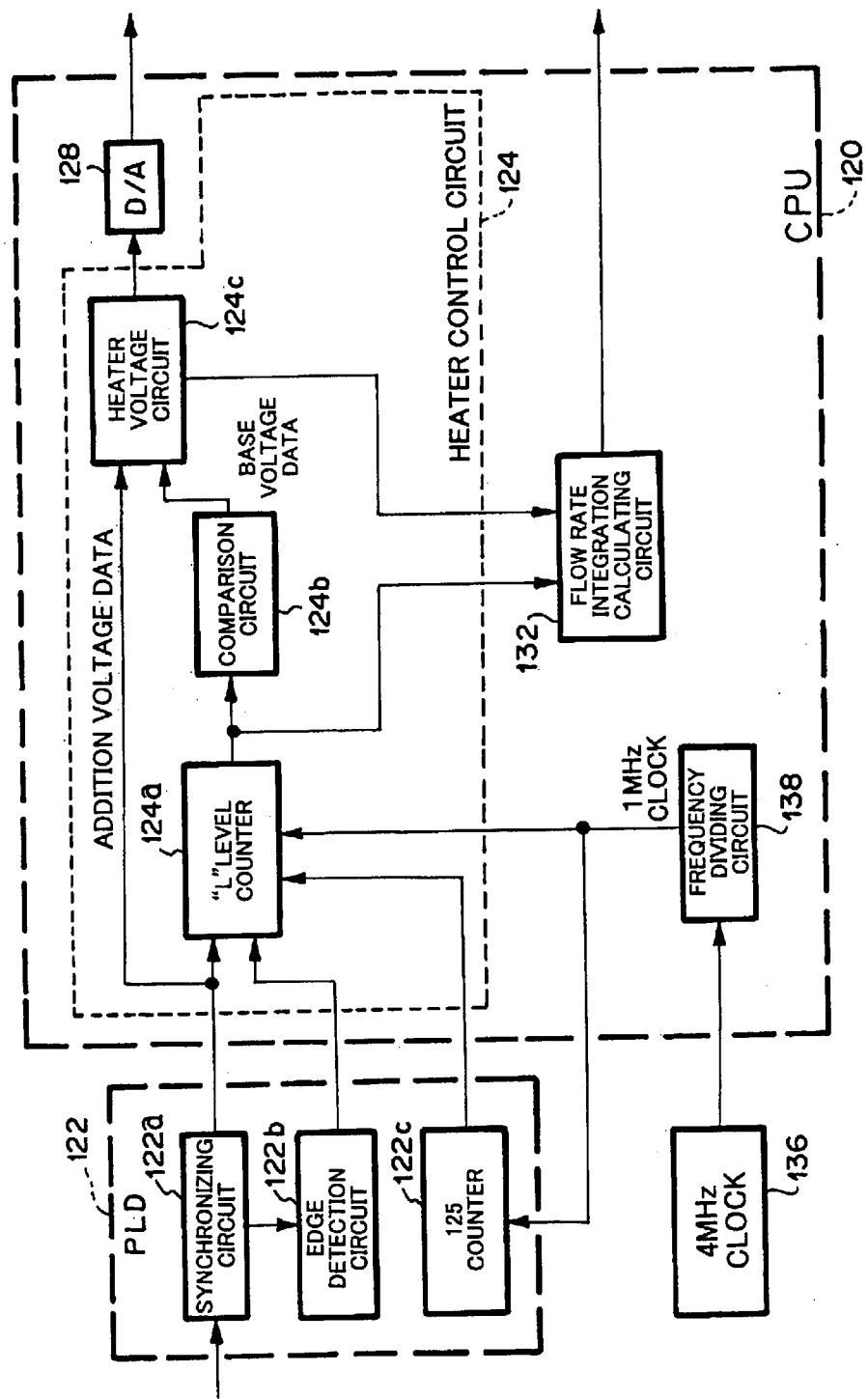
FIG. 11 is a partial detailed diagram of the circuit diagram of FIG. 10.
Figure 12:
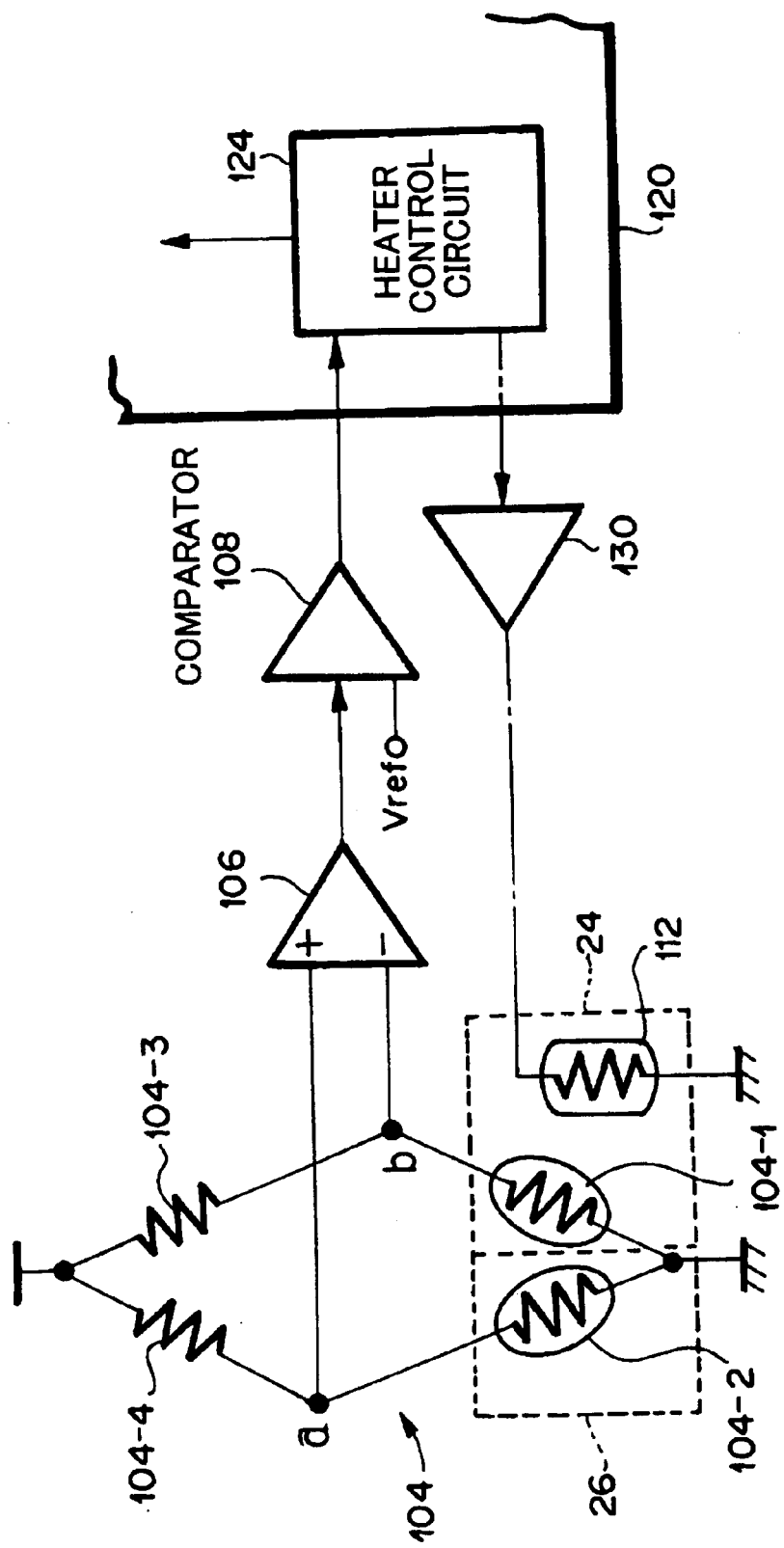
FIG. 12 is a partial detailed diagram of the circuit diagram of FIG. 10.
Figure 13:
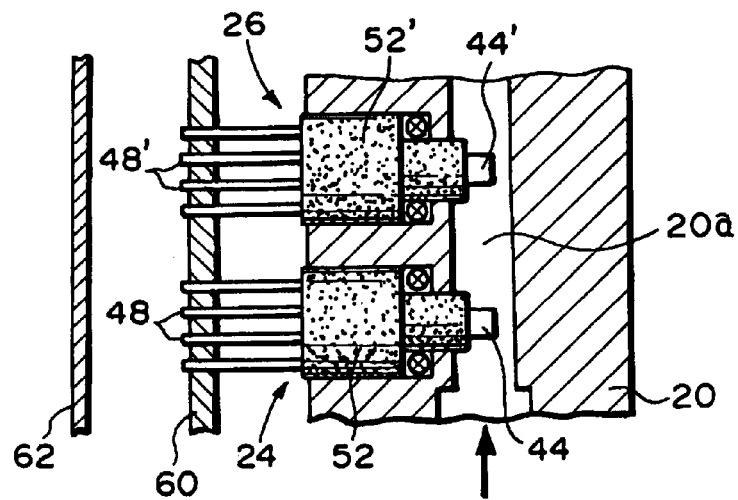
FIG. 13 is a cross-sectional view showing a flow rate detection portion of the flowmeter.
Figure 14:
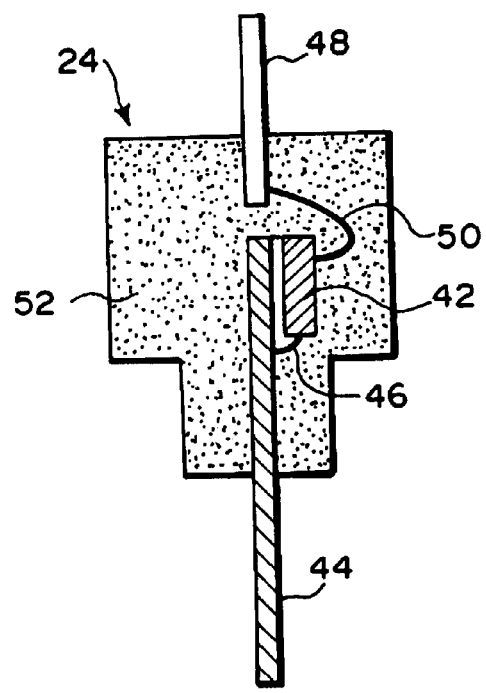
FIG. 14 is a cross-sectional view showing a flow rate detecting unit.

FIG. 10 is a circuit diagram showing an embodiment of the flowmeter according to the present invention, and FIGS. 11 and 12 are partially detailed diagrams of FIG. 10. FIG. 13 is a cross-sectional view of a flow rate detection portion of the flowmeter according to the embodiment, and FIG. 14 is a cross-sectional view of a flow rate detecting unit or flow rate sensor unit.

As shown in FIG. 13, a fluid flow passage 20a is formed in a casing member 20 formed of a material having excellent thermal conductivity such as aluminum or the like. The fluid flow passage 20 intercommunicates with a fluid flow-in port (not shown) at the lower side thereof and with a fluid flow-out port (not shown) at the upper side thereof, so that the fluid flows in from the fluid flow-in port, passes upwardly along the fluid flow passage 20a and then flows out from the fluid flow-out port (as indicated by an arrow).

A flow rate detecting unit 24 and a fluid temperature detecting unit 26 are secured to the casing member 20 so as to face the flow passage 20a. As shown in FIG. 14, in the flow rate detecting unit 24, a flow rate detector 42 is joined to the surface of a fin plate 44 serving as a heat transfer member through a joint member 46 having excellent thermal conductivity, and the electrode pad of the flow rate detector 42 and an electrode terminal 48 are connected to each other by a bonding wire 50. The flow rate detector 42 and the bonding wire 50, a part of the fin plate 44 and a part of the electrode terminal 48 are accommodated in a housing 52 formed of synthetic resin. The flow rate detector 42 is designed as a chip by forming a thin-film temperature sensing element and a thin-film heating element on a rectangular substrate so that the thin-film temperature sensing element and the thin-film heating element are insulated from each other, the substrate being formed of silicon, alumina or the like to be about 0.4 mm in thickness and about 2 mm in square.

The fluid temperature detecting unit 26 corresponds to the construction achieved by using a fluid temperature detector in place of the flow rate detector 42 in the flow rate detecting unit 24. In the fluid temperature detecting unit 26, "apostrophe (')" is affixed to the same reference numerals for the members associated with those of the flow rate detecting unit 24. The fluid temperature detector has the same construction as the flow rate detector 42 except that the thin-film heating element is removed from the flow rate detector 42.

As shown in FIG. 13, the end portions of the fin plates 44, 44' projecting from the housings 52, 52' of the flow rate detecting unit 24 and the fluid temperature detecting unit 26 extend into the flow passage 20a of the casing member 20. The fin plates 44, 44' extend so as to pass through the center in the cross section of the flow passage portion 8 having substantially the circular cross section. The fin plates 44, 44' are arranged along the flowing direction of the fluid in the flow passage 20a, so that the heat transfer can be excellently performed between the fluid and each of the flow rate detector 42 and the fluid temperature detector 42' without greatly affecting the flow of the fluid.

The tip portions of the electrode terminals 48, 48' of the flow rate detecting unit 24 and the fluid temperature detecting unit 26 penetrate through a circuit board 60 secured to the casing member 20, and is connected to a flowmeter electrical circuit portion formed on the circuit board 60. A protection cover 62 is secured to the casing member 20 to protect the circuit board 60.

As shown in FIG. 10, a DC voltage is supplied from a reference power supply circuit 102 to a sensor circuit (detection circuit) 104. The sensor circuit 104 comprises a bridge circuit as shown in FIG. 12. The bridge circuit 104 comprises a flow rate detecting thin-film temperature sensing element 104-1 of the flow rate detecting unit 24, a fluid temperature compensating thin-film temperature sensing element 104-2 of the fluid temperature detecting unit 26 and resistors 104-3, 104-4. The potential Va, Vb at the point a, b of the bridge circuit 104 is input to a differential amplifying circuit (amplifier) 106, and the output of the differential amplifying circuit 106 is input to a comparator 108. The comparison result of the output voltage signal of the amplifier 106 and a reference voltage (Vref) is output as a binary signal from the comparator 108. When the output signal of the amplifier 106 is lower than the reference voltage (Vref), the comparator 108 outputs a low (L) level [first level] signal, and when the output signal of the amplifier 106 is equal to or higher than the reference voltage (Vref), the comparator 108 outputs a high (H) level [second level] signal.

Further, as shown in FIG. 10, the DC voltage from the reference power supply circuit 102 is supplied to a thin-film heating element 112 of the flow rate detecting unit 24 through a transistor 110 for controlling the current to be supplied to the heating element 112. That is, in the flow rate detector 24, the thin-film temperature sensing element 104-1 carries out the temperature sensing operation on the basis of the heating of the thin-film heating element 112 while being affected by the endothermic action of the fluid to be detected through the fin plate 44. As a temperature sensing result, the difference between the potential Va at the point a of the bridge circuit 104 and the potential Vb at the point b of the bridge circuit 104 shown in FIG. 12 is achieved.

The value of (Va-Vb) is varied due to variation of the temperature of the flow rate detecting temperature sensing element 104-1 in accordance with the flow rate of the fluid. By properly presetting the characteristic of the bridge circuit 104 and properly setting the reference voltage (Vref) of the comparator 108, the output voltage signal of the amplifier 106 can be set to the reference voltage (Vref) of the comparator when the thin-film temperature sensing element 104-1 is kept to a predetermined heating state (that is, the temperature of the thin-film temperature sensing element 104-1 is equal to a predetermined value). In other words, the reference voltage (Vref) of the comparator is set to be equal to the value of the output voltage achieved from the amplifier 106 when the thin-film temperature sensing element 104-1 is kept under the predetermined heating state.

When the fluid flow rate is increased/reduced, the output of the comparator 108 varies. The heating of the thin-film heating element (the heater for the sensor) is controlled by using the output of the comparator 108. CPU 120 is used to control the heating of the thin-film heating element 112 and further calculate the flow rate. The output of the comparator 108 is input through PLD 122 to a heater control circuit 124 of CPU 120 as shown in FIG. 10. The output of the heater control circuit 124 is converted to an analog signal by a D/A converter 128, the analog signal thus achieved is input to an amplifier 130 to be amplified, and then the output voltage signal of the amplifier 130 is input to the base of the transistor 110. A signal is transmitted from the heater control circuit 124 to a flow rate integrating calculation circuit 132 in CPU 120, and a calculation result, etc. are output from the flow rate integrating calculation circuit 132 to a display portion 134, whereby necessary displays are made on the display portion 134.

As shown in FIG. 11, PLD 122 has a synchronizing circuit 122*a*, an edge detecting circuit 122*b* and a 125-counter 122*c*. The heater control circuit 124 has an "L" level counter 124*a*, a comparison circuit 124*b* and a heater voltage circuit 124*c*.

A clock signal is input from a 4 MHz clock circuit 136 to CPU 120. The clock signal is converted to 1 MHz clock by a frequency-dividing circuit 138 in CPU 120 and then input to the 125-counter 122*c* in PLD 122 and the "L" level counter 124*a* in the heater control circuit 124.

The output of the comparator 108 is passed through PLD 122 and then input to the "L" level counter 124*a* to be sampled every 1 μsecond (predetermined period). The "L" level counter 124*a* counts an appearance frequency of "L" level within 125 μseconds (predetermined time period) set by the 125-counter 122*c*. The data of the count value (count data CD) thus achieved by the counter 124*a* are input to the comparison circuit 124*b* to be compared with a predetermined range. The predetermined range may has a lower limit value (for example, 43) which is smaller than a half (62.5) of the sampling frequency (125) within the predetermined time period of 125 μsec and larger than zero, and has an upper limit value (for example, 82) which is larger than a half of the sampling frequency within the predetermined time period of 125 μsec and smaller than the sampling frequency (125).

In the heater voltage circuit 124*c*, a control voltage [this term is sometimes used in the same meaning as the heater applied voltage in this specification because it corresponds to an applied voltage to the heater 112] input to the transistor 130 to control the applied voltage to the heater 112 for sensor is equal to the sum of a base voltage (Eb) and addition voltage (Ec). The base voltage is selected from discrete values which are preset at intervals of predetermined step value. The value of the base voltage is fixed within each predetermined time period, and the heating of the heater is roughly controlled by the base voltage. The addition voltage has a fixed value, however, the applying time period or applying timing thereof is variable, so that the heating of the heater is finely controlled by the addition voltage. It is appropriate that the addition voltage is set to a value which is from twice to four times as high as the step value of the base voltage.

The comparison circuit 124*b* instructs the heater voltage circuit 124*c* to keep the previous base voltage in the next predetermined time period when the count data CD is not less than the lower limit value Nd and not more than the upper limit value Nu. Further, when the count data CD is less than the lower limit value Nd, the comparison circuit 124*b* instructs the heater voltage circuit 124*c* to reduce the base voltage from the previous base voltage by 1 step value in the next predetermined time period. When the count data CD is more than the upper limit value Nu, the comparison circuit 124*b* instructs the heater voltage circuit 124*c* to increase the base voltage from the previous base voltage by 1 step value in the next predetermined time period.

The output of the comparator 108 is passed through PLD 122 and then input to the heater voltage circuit 124*c*. On the basis of the input signal, the heater voltage circuit 124*c* allows application of the addition voltage (Ec) during the period when the input signal is kept under "L" level, and prohibits application of the addition voltage (Ec) during the other period.

The heater voltage control as described above will be described in detail with reference to the time chart of FIG. 15.

Figure 15:
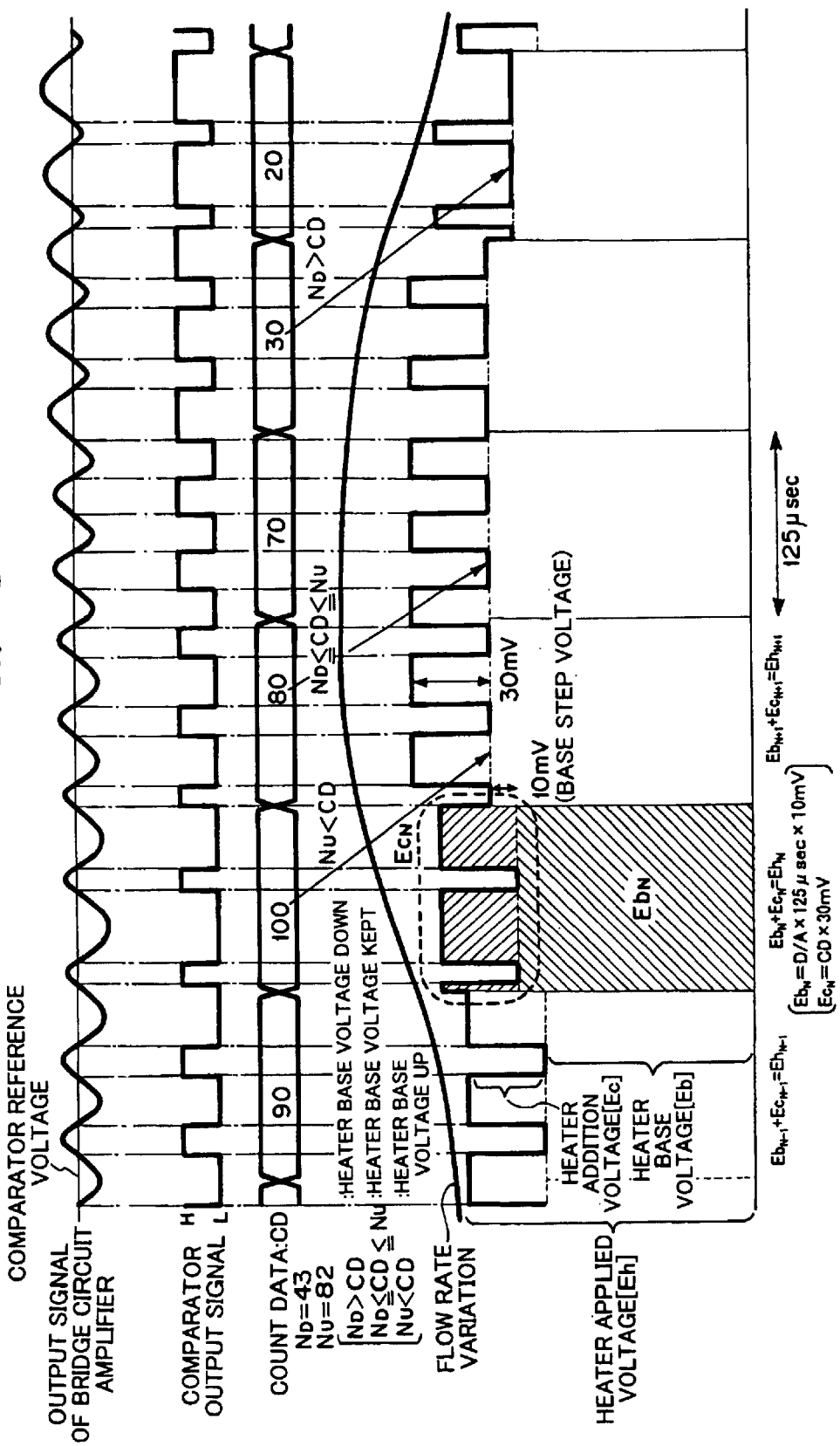
FIG. 15 is a time chart showing heater voltage control.

FIG. 15 shows the time-variation in the relationship between the output signal (the input signal to the comparator 108) of the amplifier 106 connected to the bridge circuit 104 and the reference voltage (Vref) of the comparator 108, and also shows the time-variation of the output signal of the comparator 108. Further, FIG. 15 shows variation of the count data CD input to the comparison circuit 124*b* achieved in the "L" level counter 124*a* every 125 μseconds, and also shows the time-variation of the heater applied voltage (Eh) in association with the variation of the count data CD. Further, FIG. 15 schematically shows the time-variation of an actual flow rate in association with the time variation of the heater applied voltage (Eh).

The lower limit and upper limit values Nd and Nu set in the comparison circuit 124*b* are set to 43 and 82, respectively. In case of $43 \leq CD \leq 82$, on the basis of the instruction from the comparison circuit 124*b*, during the predetermined time period of 125 μseconds subsequent to the predetermined time period at which the count data CD is achieved, the base voltage Eb is not changed, but kept to the value at the just-before predetermined time period in the heater voltage circuit 124*c*. In case of CD<43, on the basis of the instruction from the comparison circuit 124*b*, during the predetermined time period of 125 μseconds subsequent to the predetermined time period at which the count data CD is achieved, the base voltage Eb is reduced by only 1 step voltage value (in this case, 10 mV) from the value at the just-before predetermined time period in the heater voltage circuit 124*c*. In case of CD>82, on the basis of the instruction from the comparison circuit 124*b*, during the predetermined time period of 125 μseconds subsequent to the predetermined time period at which the count data CD is achieved, the base voltage Eb is increased by only 1 step voltage value (in this case, 10 mV) from the value at the just-before predetermined time period in the heater voltage circuit 124c.

On the other hand, in the heater voltage circuit 124c, a prescribed addition voltage (Ec: 30 mV in this case) is applied during the period when the output signal of the comparator 108 is under "L" level, and no addition voltage is applied during the period when the output signal of the comparator 108 is under "H" level.

As described above, according to this embodiment, on the basis of count data CD achieved within a prescribed time period, the base voltage within the subsequent prescribed time period is properly set, and the addition voltage applying time period is properly set in accordance with the output of the comparator. By combining these two control operations (setting operations), the response of the control can be enhanced, the precision of the flow rate measurement can be enhanced and the thermal hysteresis can be reduced with a simple device construction.

The predetermined time period, the predetermined period, the base voltage step value, the addition voltage value and the other parameters may be properly set in consideration of the predicted maximum variation of the flow rate so as to support this predicted maximum variation.

As described above, the heating of the thin-film heating element 112 is controlled so that the temperature of the flow rate detecting temperature sensing element 104-1 is equal to a predetermined value (that is, the heating state of the flow rate detecting temperature sensing element 104-1 is set to a predetermined state) irrespective of the variation of the fluid flow rate. At this time, the voltage (the heater applied voltage) applied to the thin-film heating element 112 corresponds to the fluid flow rate, so that it is taken out as the flow rate output in the flow rate integration calculating circuit 132 shown in FIGS. 10 and 11. For example, the instantaneous flow rate is output every 0.5 second and the instantaneous flow rate thus output is integrated to achieve the integrated flow rate.

Figure 16:
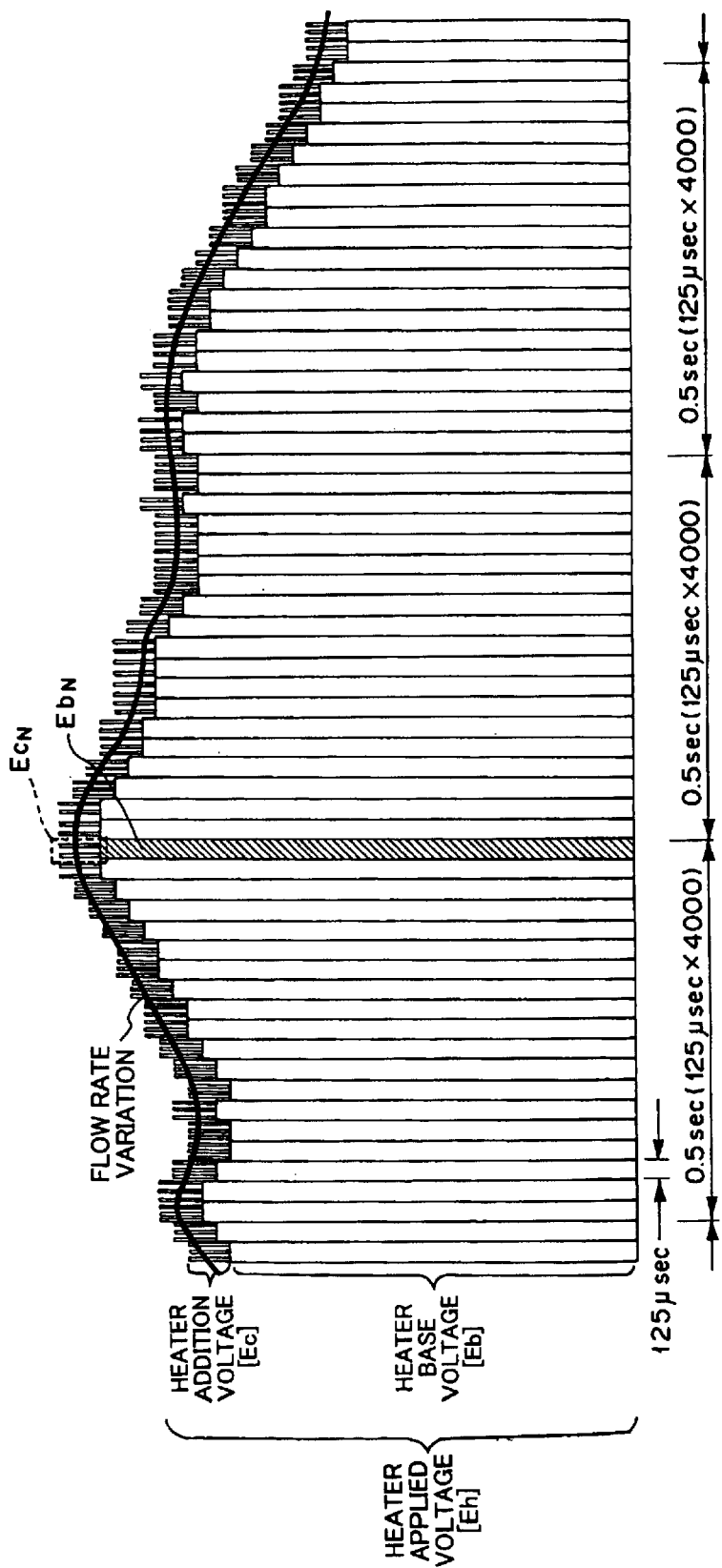
FIG. 16 is a time chart showing variation of a heater voltage and calculation of a flow rate value.

That is, as shown in FIG. 11, the integration value ($\Sigma$Ec) of the addition voltage Ec applied for 0.5 second is achieved on the basis of the count data CD for each predetermined time period achieved in the "L" level counter 124a, the integration value ($\Sigma$Eb) of the base voltage Eb applied for 0.5 second is achieved on the basis of the base voltage value Eb achieved in the heater voltage circuit 124c, and the total value ($\Sigma$Ec+$\Sigma$Eb=$\Sigma$Eh) is achieved (see FIG. 16). This value is converted to the instantaneous flow rate value by using the calibration curves (instantaneous flow rate conversion table) which are measured and stored in advance. This instantaneous flow rate conversion table is a table indicating the relationship between the integration value of the heater applied voltage for 0.5 second and the flow rate value. Specifically, the instantaneous flow rate conversion table intermittently shows the relationship between the integration value of the heater applied voltage and the flow rate value, and thus data are complemented to achieve the flow rate value from the actually-achieved integration value of the heater applied voltage. The integrated flow rate value is obtained by integrating the instantaneous flow rate values.

The output of the flow rate is displayed by the display portion 134. On the basis of the instruction from CPU 120, the instantaneous flow rate value and the integrated flow rate value may be properly stored in a memory, and these data may be transmitted to the outside through a communication line such as a telephone line or other networks.

Figure 17:
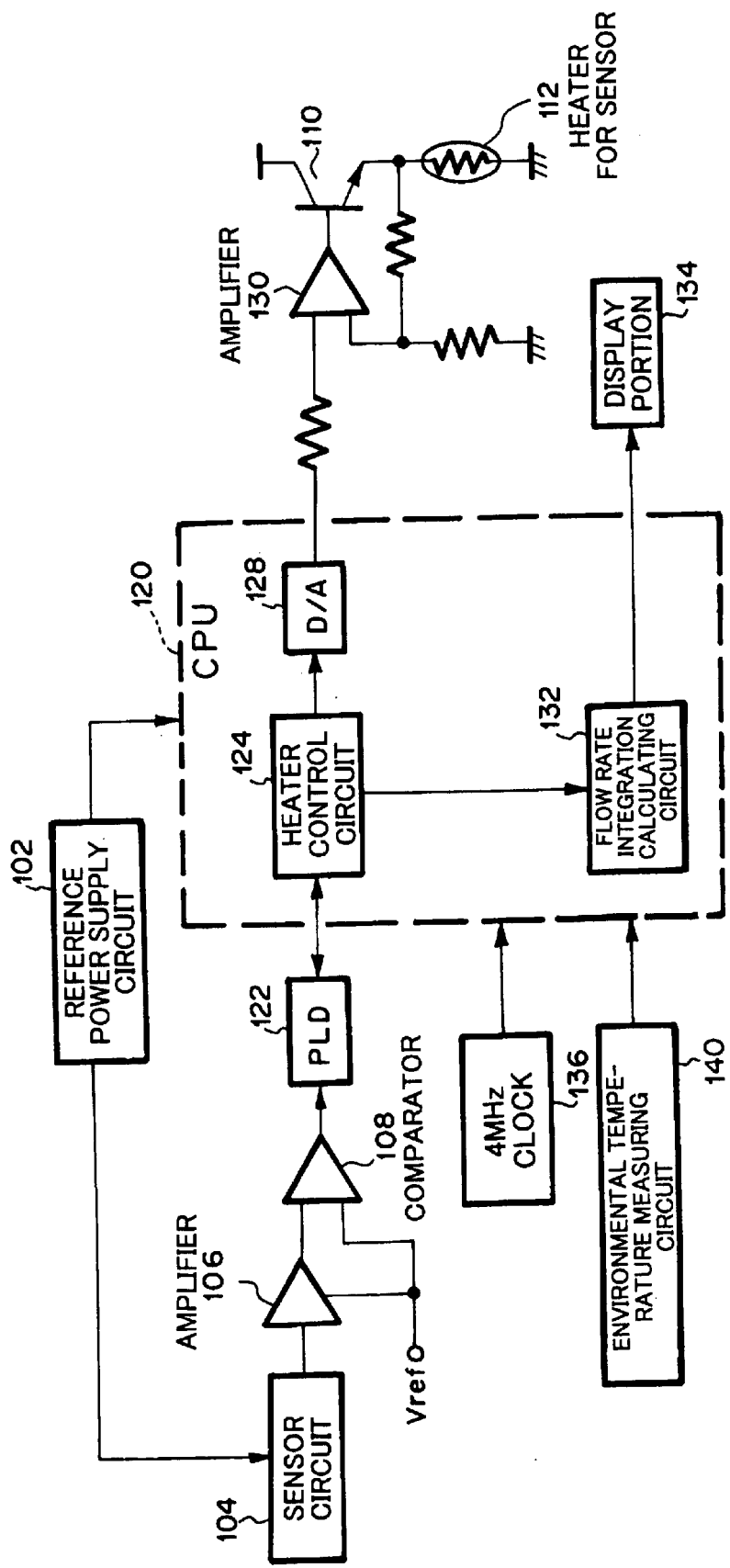
FIG. 17 is a circuit diagram showing an embodiment of the flowmeter according to the present invention.
Figure 18:
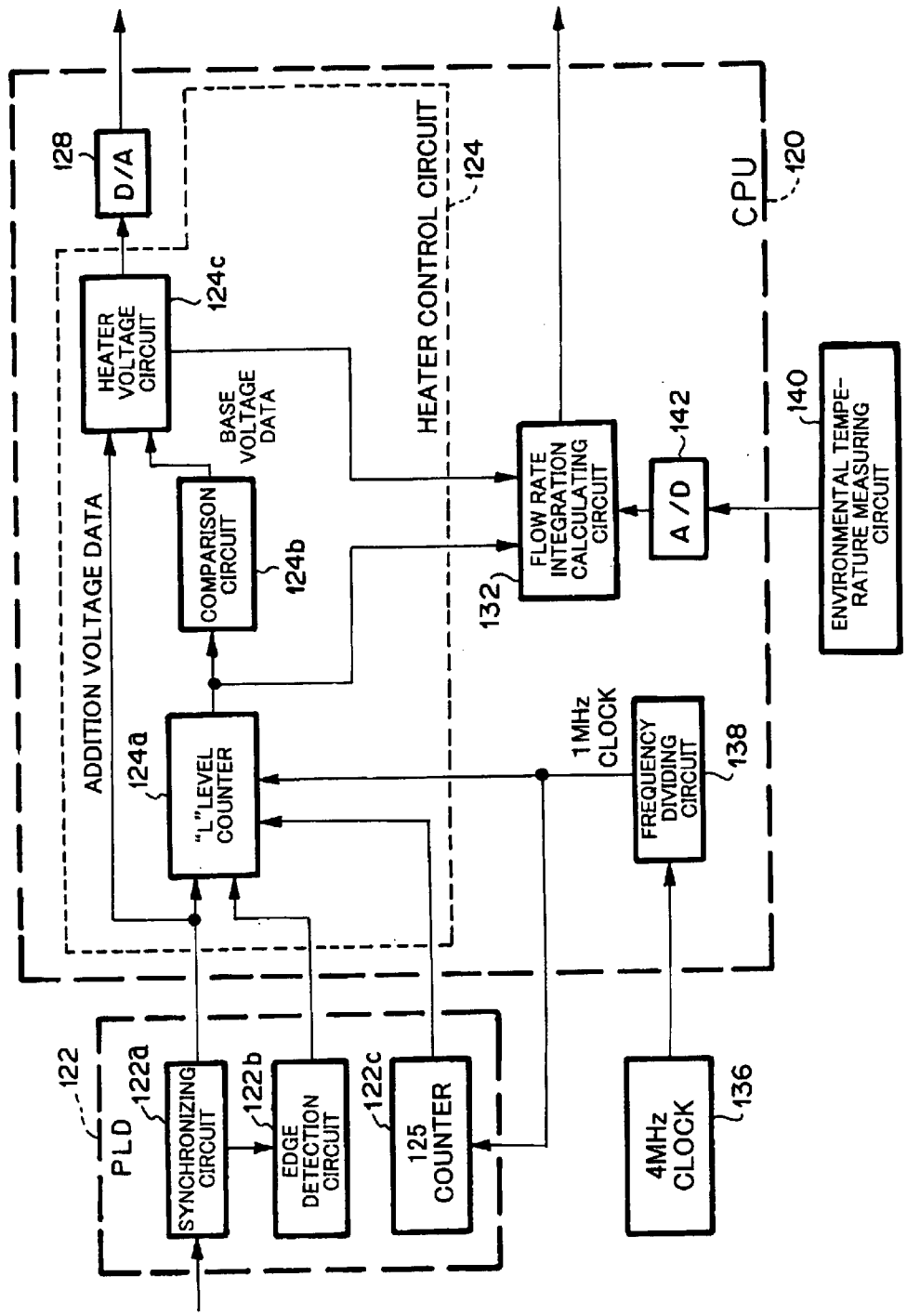
FIG. 18 is a partial detailed diagram of the circuit diagram of FIG. 17.

FIG. 17 is a circuit diagram showing an embodiment of the flowmeter according to the present invention, and FIG. 18 is a partially detailed diagram of the flowmeter of FIG. 17.

This embodiment has the same construction as the embodiment shown in FIGS. 10 to 16 except that an environmental temperature measuring circuit 140 and an A/D converter 142 shown in FIGS. 17 and 18 are added. The environmental temperature measuring circuit 140 is provided to the flowmeter electrical circuit portion (not shown) on the circuit board 60 shown in FIG. 13, and measures the temperature (environmental temperature) at this position. The environmental temperature measuring circuit 140 may be constructed by using a temperature sensing resistor such as a platinum resistor or the like, and outputs the electrical signal corresponding to the environmental temperature (which is mainly determined by the effect of the external temperature and the temperature of the fluid).

In this embodiment, the same operation as the embodiment shown in FIGS. 10 to 16 is performed except the measurement of the environmental temperature and the processing using the measurement result.

According to this embodiment, in the same manner as the embodiment shown in FIGS. 10 to 16, the integration value ($\Sigma$Ec) of the addition voltage Ec applied for 0.5 second is achieved on the basis of the value of the count data CD for each predetermined time period which is achieved by the "L" level counter 124a, the integration value ($\Sigma$Eb) of the base voltage Eb applied for 0.5 second is achieved on the basis of the base voltage Eb achieved in the heater voltage circuit 124c, and then the total value thereof ($\Sigma$Ec+$\Sigma$Eb=$\Sigma$Eh) (see FIG. 16). This total value is equal to any one of discrete values (represented by digital values of 29 bits in this embodiment). This value is converted to the instantaneous flow rate value by using the calibration curves (instantaneous flow rate conversion table) which are measured and stored in advance. The instantaneous flow rate conversion table is a data table indicating the relationship between the integration value of the heater applied voltage for 0.5 second and the flow rate value.

Figure 19:
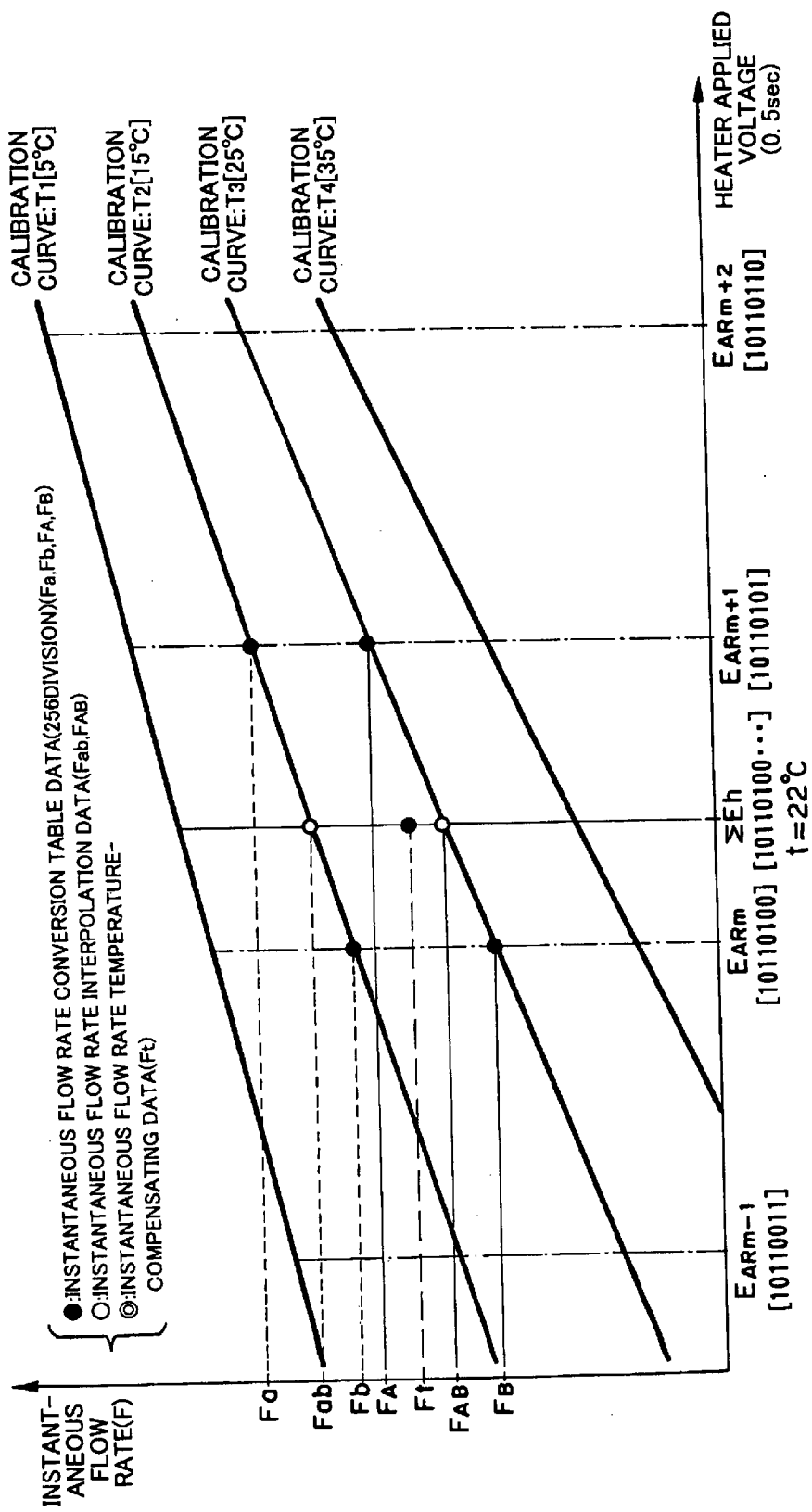
FIG. 19 is a diagram showing an instantaneous flow rate converting table.

In this embodiment, the instantaneous flow rate conversion table comprises plural individual calibration curves formed every discrete temperature value. FIG. 19 shows an example of the instantaneous flow rate conversion table as described above. Individual calibration curves $T_1$ to $T_4$ for four discrete temperature values $t_1$ to $t_4$ (5° C., 15° C., 25° C. and 35° C.) are shown in FIG. 19. In FIG. 19, each calibration curve is illustrated as a continuous line, however, this illustration is used for convenience's sake of description. Actually, the association relationship between each of the discrete heater applied voltages (integration values for 0.5 second) . . . $E_{ARm-1}$, $E_{ARm}$, $E_{ARm+1}$, $E_{ARm+2}$, . . . shown in FIG. 19 and the instantaneous flow rate is shown. In this embodiment, the instantaneous flow rate conversion table does not show the relationship for all the possible heater applied voltage integration values. That is, the integration values of these possible heater applied voltage are sectioned into plural groups in order of the magnitude, and the minimum values of the respective groups are represented by . . . $E_{ARm-1}$, $E_{ARm}$, $E_{ARm+1}$, $E_{ARm+2}$, . . . The minimum values of those values which have the same high-order 8 bits in digital values that possibly represent the heater applied voltages may be used as the above discrete representative values. In this case, 256 representative values are provided.

Further, as shown in FIGS. 17 and 18, an environmental temperature value (for example, represented by a digital value of 10 bits) t is input from the environmental temperature measuring circuit 140 through the A/D converter 142 to the flow rate integration calculating circuit 132.

Figure 20:
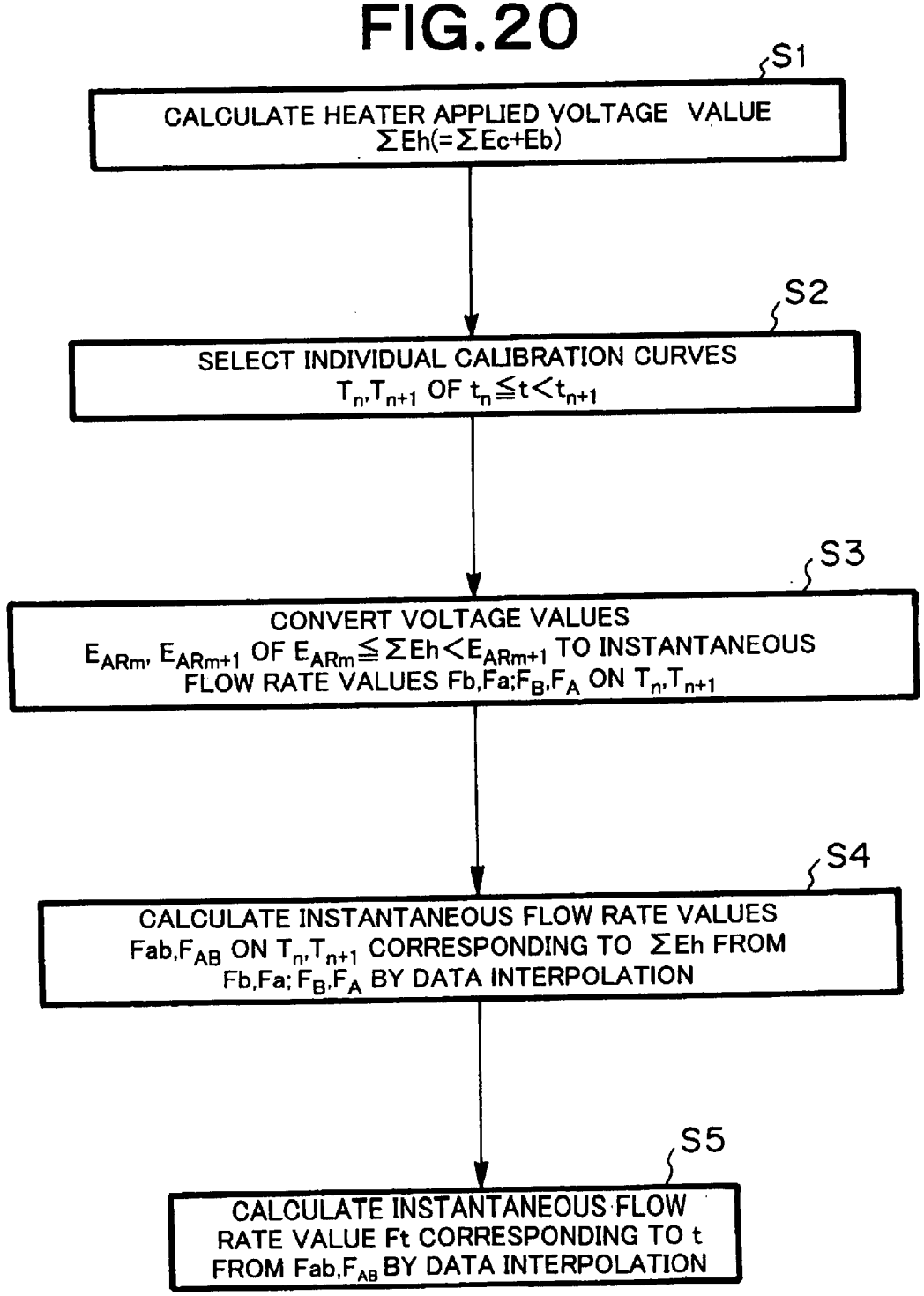
FIG. 20 is a flowchart showing the operation of a flow rate integrating circuit of the flowmeter.

In the flow rate integration calculating circuit 132, the data interpolation calculation is carried out according to the procedure shown in FIG. 20 on the basis of the count data value CD, the base voltage Eb and the environmental temperature value t by using the instantaneous flow rate conversion table as described above to achieve the instantaneous flow rate value.

That is, the heater applied voltage value ΣEh (=ΣEc+ΣEb) corresponding to the total value of the integration value of the addition voltage Ec and the integration value of the base voltage Eb for 0.5 second is first calculated (S1).

Next, the individual calibration curves $T_n$, $T_{n+1}$ (in the example of FIG. 19, n=2; that is, $T_2[t_2=15°$ C.], $T_3[t_3=25°$ C.]) satisfying $t_n \leq t < t_{n+1}$ for the environmental temperature value t measured (22° C. in the example of FIG. 19) are selected (S2).

Next, the voltage values $E_{ARm}$ and $E_{ARm+1}$ satisfying $E_{ARm} \leq \Sigma Eh < E_{ARm+1}$ are achieved. That is, the representative value $E_{ARm}$ of the group having the value ([10110100] in the example of FIG. 19) represented by the high-order 8 bits of ΣEh and the representative value $E_{ARm+1}$ of the group having the value ([10110101] in the example of FIG. 19) achieved by adding the value of the high-order 8 bits of ΣEh with "1" are achieved. The voltage values $E_{ARm}$ and $E_{ARm+1}$ are converted to instantaneous flow rate values $F_b$, $F_a$; $F_B$, $F_A$ on the individual calibration curves $T_n$, $T_{n+1}$ (S3).

Next, the instantaneous flow rate values $F_{ab}$, $F_{AB}$ on $T_n$, $T_{n+1}$ corresponding to ΣEh are achieved from values $F_b$, $F_a$; $F_B$, $F_A$ by the data interpolating calculation. At this time, the following equations (1), (2) are used (S4).

$$F_{ab}=(F_a-F_b)(\Sigma Eh-E_{ARm})/(E_{ARm+1}-E_{ARm})+F_b \quad (1)$$

$$F_{AB}=(F_A-F_B)(\Sigma Eh-E_{ARm})/(E_{ARm+1}-E_{ARm})+F_B \quad (2)$$

Next, the instantaneous flow rate value Ft corresponding to ΣEh for the environmental temperature value t is achieved from $F_{ab}$, $F_{AB}$ by the data interpolating calculation. At this time, the following equation (3) is used (S5).

$$Ft=(F_{ab}-F_{AB})(t-T_3)/(T_2-T_3)+F_{AB} \quad (3)$$

Figure 21:
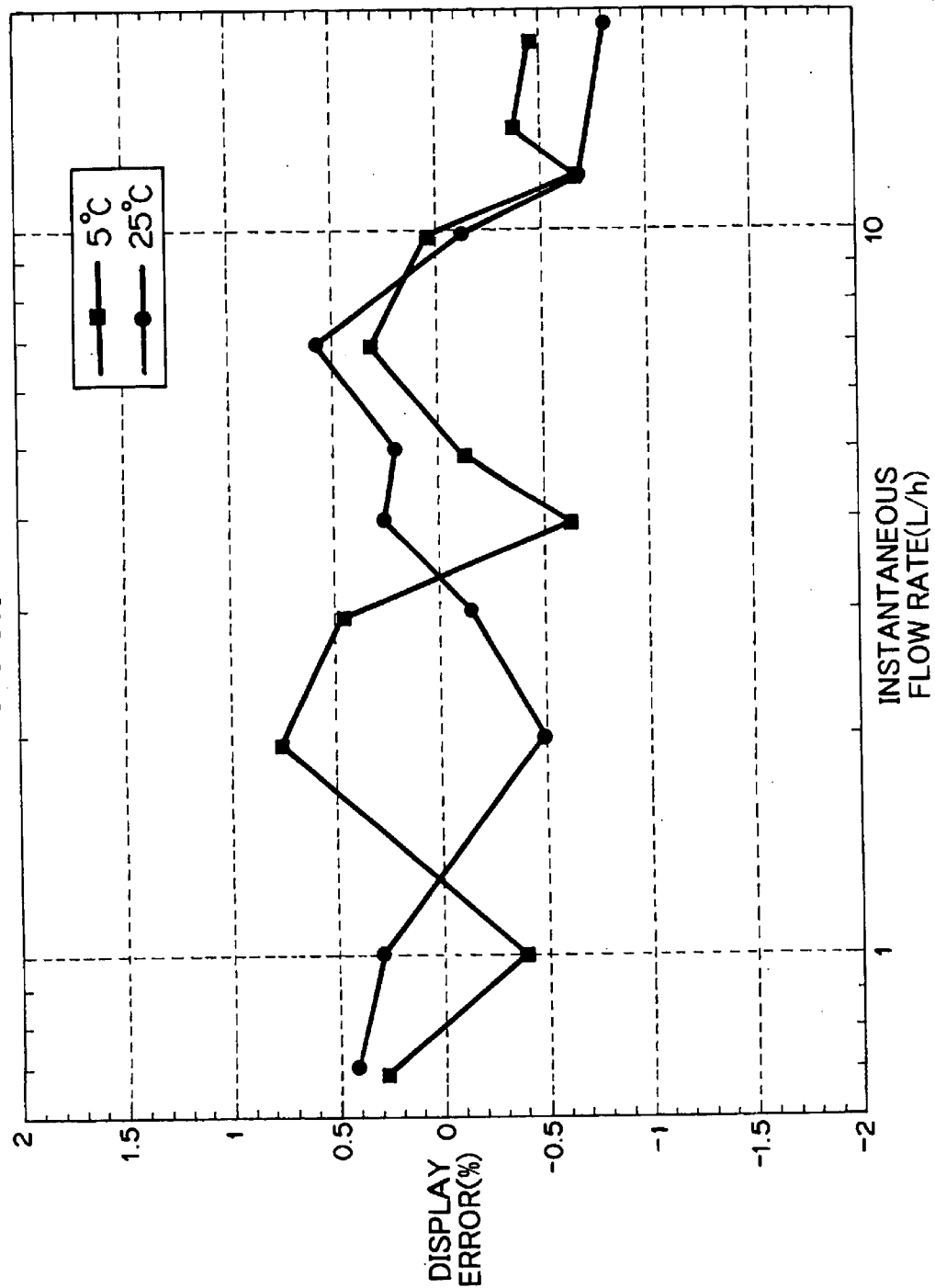
FIG. 21 is a diagram showing error measurement data of the flowmeter.

By achieving the instantaneous flow rate value Ft at the environmental temperature with the data interpolating calculation as described above, volume of the data of the instantaneous flow rate conversion table can be reduced. In addition, the instantaneous flow rate measurement can be performed with extremely little measurement error due to the environmental temperature. FIG. 21 shows an example of the measurement result of the measurement error (display error) every flow rate value, which was achieved by using the flowmeter of this embodiment. It is apparent from FIG. 21 that high precision within ±1% in error was achieved.

In the flow rate integration calculating circuit 132, the instantaneous flow rate value achieved is also integrated to achieve the integrated flow rate value.

The flow rate outputs such as the instantaneous flow rate value and the integrated flow rate value thus achieved are displayed on the display portion 134. On the basis of the instruction from CPU 120, the instantaneous flow rate value and the integrated flow rate value may be properly stored in a memory, and further may be transmitted to the outside through a communication line such as a telephone line or other networks.

Figure 22:
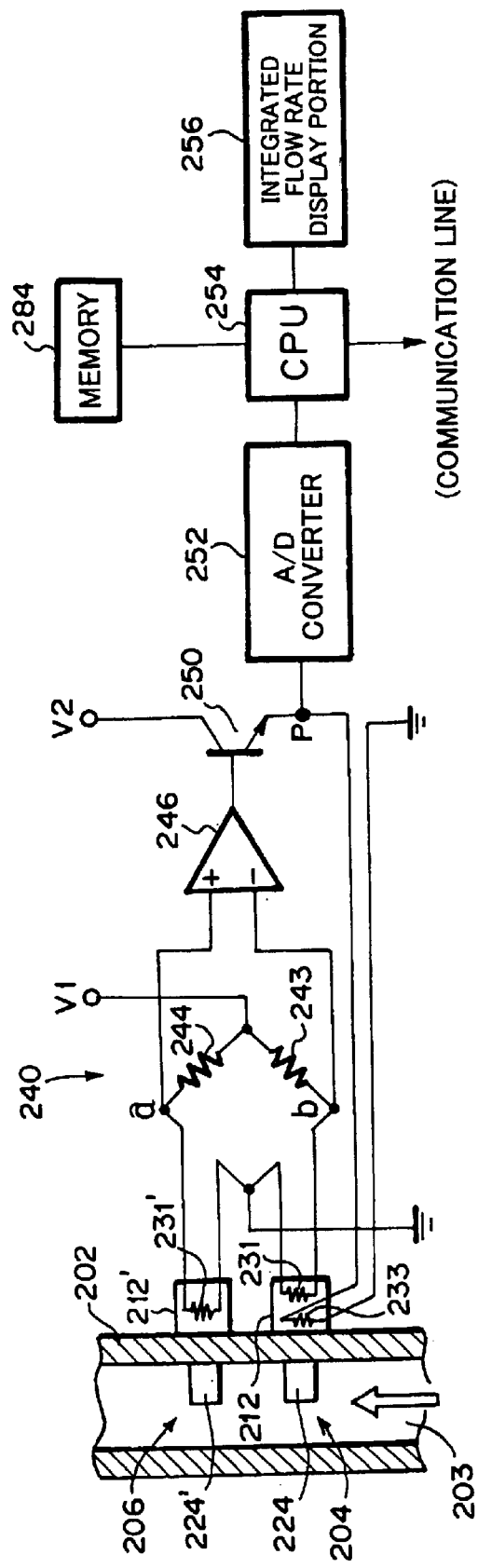
FIG. 22 is a schematic diagram showing a flow rate detection system of the flowmeter according to the present invention.
Figure 23:
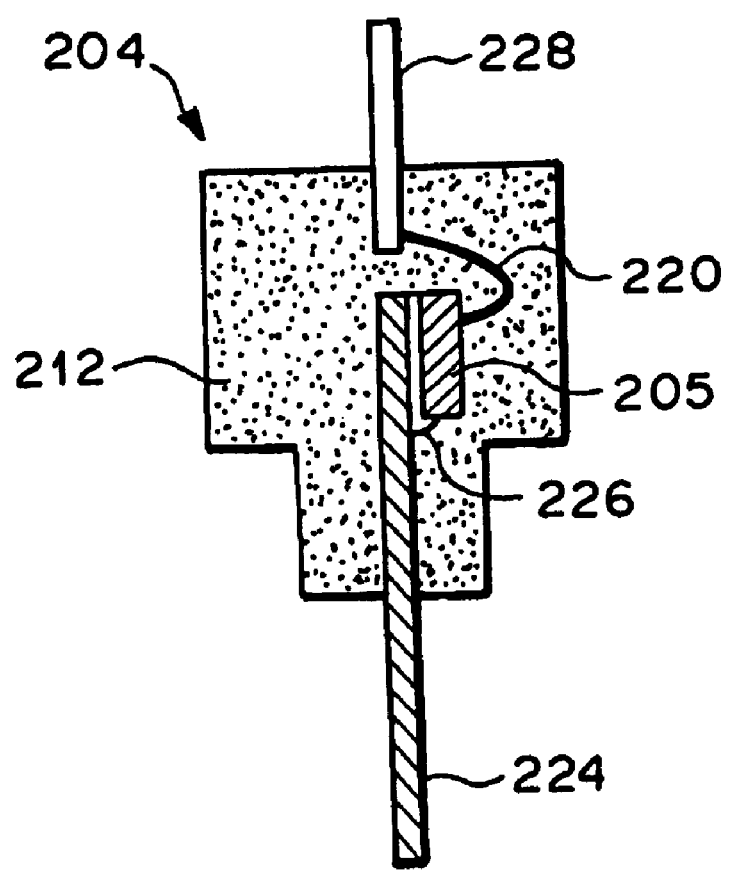
FIG. 23 is a cross-sectional view showing the flow rate detecting unit of the flowmeter according to the present invention.

FIG. 22 is a schematic diagram showing the overall construction of the flowmeter, particularly, the flow rate detection system of the flowmeter according to the present invention, and FIG. 23 is a cross-sectional view showing the flow rate detecting unit.

First, the construction of a flow rate sensor unit of this embodiment will be described with reference to FIG. 23. As shown in FIG. 23, in a flow rate detecting unit 204, a flow rate detector 205 is joined to the surface of a fin plate 224 serving as a heat transfer member by joint material 226 having excellent thermal conductivity, and an electrode pad of the flow rate detector 205 and an electrode terminal 228 are connected to each other through a bonding wire 220. Further, the flow rate detector 205 and the bonding wire 220, and a part of the fin plate 224 and a part of the electrode terminal 228 are accommodated in a synthetic resin housing 212. The flow rate detector 205 has the construction as shown in FIG. 6.

A fluid temperature detecting unit 206 has the same construction as the flow rate detecting unit 204 except that a fluid temperature detector is used in place of the flow rate detector 205 in the flow rate detecting unit 204. In the fluid temperature detecting unit 206, the parts corresponding to those of the flow rate detecting unit 204 are represented by the same reference numerals affixed with apostrophe "''". The fluid temperature detector has the same construction as shown in FIG. 7.

As shown in FIG. 22, the end portions of fin plates 224, 224' projecting from the housings 212, 212'' of the flow rate detecting unit 204 and the fluid temperature detecting unit 206 extend into the fluid flow passage 203 of the fluid flow passage member 202. The fin plates 224, 224'' extend to pass through the center in the cross section of the fluid flow passage 203 having a substantially circular cross section. The fin plates 224, 224' are arranged along the fluid flowing direction in the fluid flow passage 203, so that excellent heat transfer between each of the flow rate detector 205 and the fluid temperature detector and the fluid can be performed without greatly affecting the fluid flow.

A DC voltage V1 is applied from a power supply circuit (not shown) to a bridge circuit 240. The bridge circuit 240 comprises a thin-film temperature sensing element 231 for flow rate detection of the flow rate detecting unit 204, a thin-film temperature sensing element 231' for temperature compensation of the fluid temperature detecting unit 206 and resistors 243, 244. The potential Va, Vb at the point a, b of the bridge circuit 240 is input to a differential amplifying/integrating circuit 246.

A DC voltage V2 from the power supply circuit is supplied to a thin-film heating element 233 of the flow rate detecting unit 204 through a transistor 250 for controlling current to be supplied to the thin-film heating element 233. That is, in the flow rate detector 205, the thin-film temperature sensing element 231 carries out the temperature sensing operation on the basis of the heating of the thin-film heating element 233 with being affected by the endothermic action of the fluid to be detected through the fin plate 224. As a result of the temperature sensing is achieved the difference between the potential Va at the point a of the bridge circuit 240 and the potential Vb at the point b of the bridge circuit 240 shown in FIG. 22.

The value of (Va-Vb) is varied due to variation of the temperature of the temperature sensing element 231 for flow rate detection in accordance with the flow rate of the fluid. By properly setting the resistance values of the resistors 243, 244 of the bridge circuit 240 in advance, the value of (Va-Vb) can be set to zero when the fluid flow rate is equal to a desired value (reference value). At the reference flow rate, the output of the differential amplifying/integrating circuit 246 is equal to a fixed value (the value corresponding to the reference flow rate), and the resistance value of the transistor 250 is equal to a fixed value. In this case, a divided voltage to be applied to the thin-film heating element 233 is also equal to a fixed value, and thus the voltage at the point P at this time indicates the reference flow rate.

When the fluid flow rate is increased/reduced, the output of the differential amplifying/integrating circuit 246 varies in polarity (varied in accordance with positive/negative sign of the resistance-temperature characteristic of the temperature sensing element 231 for flow rate detection) and magnitude, and the output of the differential amplifying/integrating circuit 246 is varied in accordance with the variation in polarity and magnitude.

When the fluid flow rate is increased, the temperature of the temperature sensing element 231 for flow rate detection is reduced, and thus the differential amplifying/integrating circuit 246 supplies the base of the transistor 250 with such a control input that the resistance value of the transistor 250 is reduced to thereby increase the heating value of the thin-film heating element 233 (that is, to increase the power).

On the other hand, when the fluid flow rate is reduced, the temperature of the temperature sensing element 231 for flow rate detection increases, and thus the differential amplifying/integrating circuit 246 supplies the base of the transistor 250 with such a control input that the resistance value of the transistor 250 is increased to thereby reduce the heating value of the thin-film heating element 233 (that is, to reduce the power).

As described above, the heating of the thin-film heating element 233 is feed-back controlled so that the temperature detected by the temperature sensing element 231 for flow rate detection is equal to a target value irrespective of the variation of the fluid flow rate. Further, the voltage (the voltage at the point P) applied to the thin-film heating element 233 corresponds to the fluid flow rate, and thus it is taken out as an output of the flow rate.

The output of the flow rate of this detection circuit is A/D-converted by an A/D converter 252, and then converted to the corresponding flow rate (instantaneous flow rate) by CPU 254. The flow rate thus achieved is integrated with respect to the time to calculate the integrated flow rate (integrated flow amount). The values of the instantaneous flow rate and the integrated flow rate can be displayed by an integrated flow rate display portion 256, and stored in a memory 284. Further, these values may be transmitted to the outside through a communication line such as a telephone line or other networks.

Figure 24:
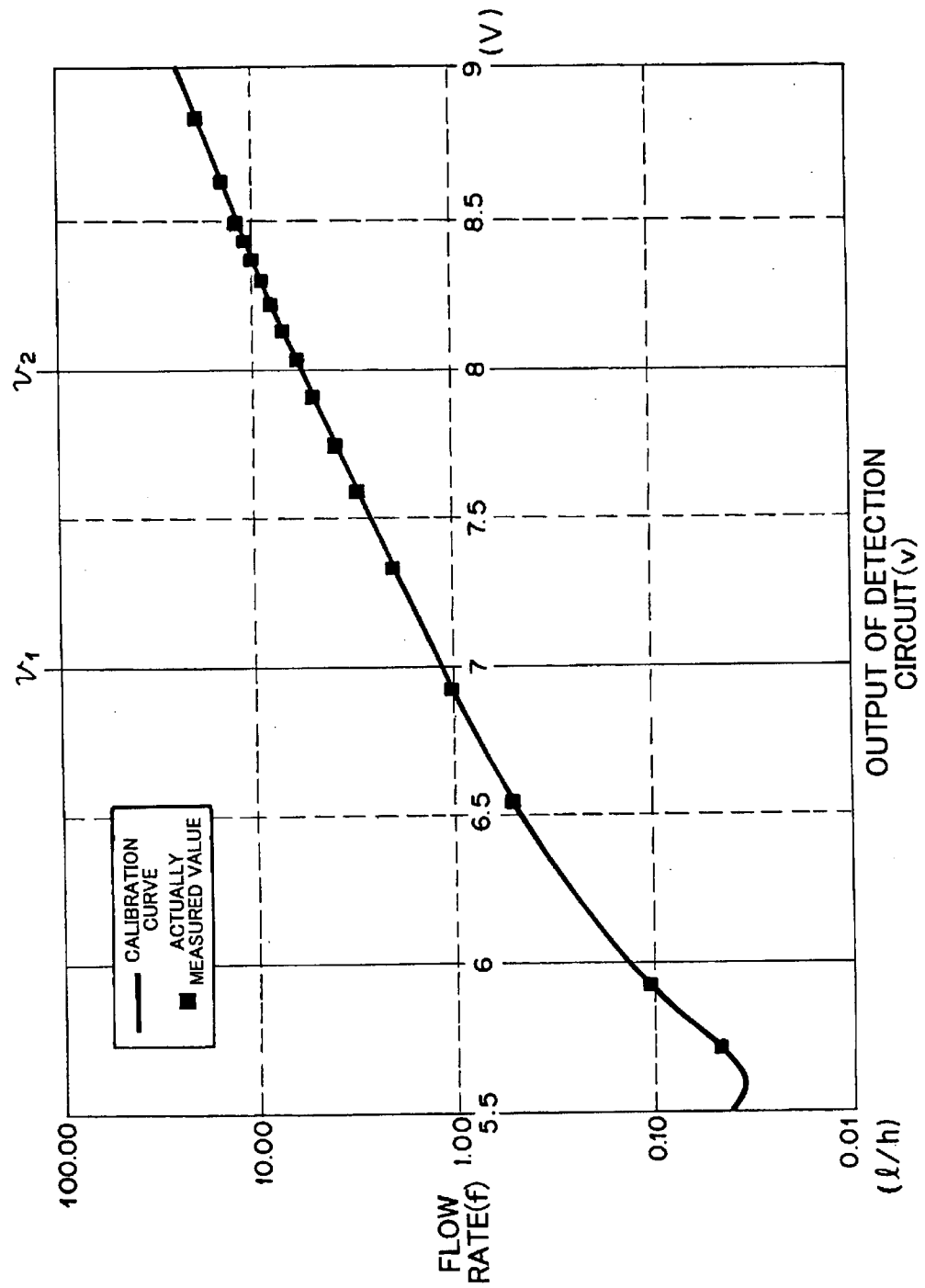
FIG. 24 is a diagram showing an example of a calibration curve in the flowmeter according to the present invention.

The conversion from the output of the detection circuit to the flow rate in CPU 254 is carried out as follows. The calibration curve for conversion to the flow rate is stored in the memory 284 in advance. An example of the calibration curve is shown in FIG. 24. The calibration curve is represented as follows:

$$f=a_1v^4+b_1v^3+c_1v^2+d_1v+e_1 (0 \leq v < v_1)$$

$$f=a_2v^4+b_2v^3+c_2v^2+d_2v+e_2 (v_1 \leq v < v_2)$$

$$f=a_3v^4+b_3v^3+c_3v^2+d_3v+e_3 (v_2 \leq v)$$

wherein f [liter/h] represents the fluid flow rate, v[V] represents the output of the detection circuit, and $a_1$, $b_1$, $c_1$, $d_1$, $e_1$; $a_2$, $b_2$, $c_2$, $d_2$, $e_2$; $a_3$, $b_3$, $c_3$, $d_3$, $e_3$ represents coefficients.

In the case shown in FIG. 24, $v_1$ = 7.0 [V]
$v_2$ = 8.0 [V]
$a_1$ = +1.99933E−1
$b_1$ = −4.84409E+0
$c_1$ = +4.44365E+1
$d_1$ = −1.82380E+2
$e_1$ = +2.81911E+2
$a_2$ = +3.45600E−1
$b_2$ = −8.77327E+0
$c_2$ = +8.40224E+1
$d_2$ = −3.58917E+2
$e_2$ = +5.75936E+2
$a_3$ = +6.55492E+0
$b_3$ = −2.13636E+2
$c_3$ = +2.61702E+3
$d_3$ = −1.42694E+4
$e_3$ = +2.92043E+4

Accordingly, it is sufficient to store only the function style of $f=av^4+bv^3+cv^2+dv+e$, two threshold values $v_1$, $v_2$ serving as boundaries of three areas of the output values of the detection circuit (the first area of $0 \leq v < v_1$, the second area of $v_1 \leq v < v_2$, and the third area of $v_2 \leq v$), and the values of a to e ($a_1$ to $e_1$, $a_2$ to $e_2$, $a_3$ to $e_3$) every area as the content of the calibration curve to be stored in the memory 284, and thus the capacity of the memory 284 may be small.

FIG. 24 is a graph in which actual measurement values of the flow rate are plotted. These measurement values show the relationship between the output value of the detection circuit of the flowmeter when fluid is made to flow into the flowmeter of this embodiment and the flow rate value achieved by actually measuring the volume of the fluid flown in the flowmeter, and it is apparent from FIG. 24 that these measurement values excellently meet the calibration curve.

The technical background to explain that the measurement values excellently meet the calibration curve will be described. The flow rate measurement can be also performed with excellent precision by using a calibration curve represented by one function over all the area of the output values of the detection circuit. However, in this case, six-order or higher-order function styles are needed and the numerical calculation is extremely complicated. Therefore, according to the present invention, the area of the output values of the detection circuit is divided into three parts, and the calibration curves which have different coefficients, but are represented by the same function style are used for all these three parts, whereby a four-order function style can be used as the function style. In addition, the flow rate measurement can be performed with excellent precision without increasing the memory capacity so much. Accordingly, the memory area used when the calibration curve is individually set for each of plural environmental temperature values can be prevented from being greatly increased, and this makes it easy to measure the environmental temperature and use a proper calibration curve (if necessary, extrapolation is carried out with use of two calibration curves) based on the environmental temperature thus measured, thereby performing the higher-precision flow rate measurement.

The calibration curve as described above can be created by determining five coefficients of the above function style for each area by using the least squares method on the basis of the actual measurement as shown in FIG. 24. The threshold value $v_1$ may be set so that the flow rate value is within the range from 0.5 to 2.0, and the threshold value $v_2$ may be set so that the flow rate value is within the range from 4.0 to 12.0. With this setting, the calibration curve which excellently meets the actual measurement values as shown in FIG. 24 can be achieved.

In CPU 254, one of the three areas to which the output v of the detection circuit belongs is specified, and then the calculation using the function having the coefficients corresponding to the area thus specified is made to achieve the flow rate value f.

As described above, in the flowmeter of this embodiment, the flow rate measurement can be performed with high precision even when the flow rate value to be detected varies in a broad range.

Further, according to this embodiment, the minute chip containing the thin-film heating element and the thin-film temperature sensing element is used as the flow rate detector. Therefore, the high response as described above can be implemented, and the precision of the flow rate measurement can be enhanced.

Figure 25:
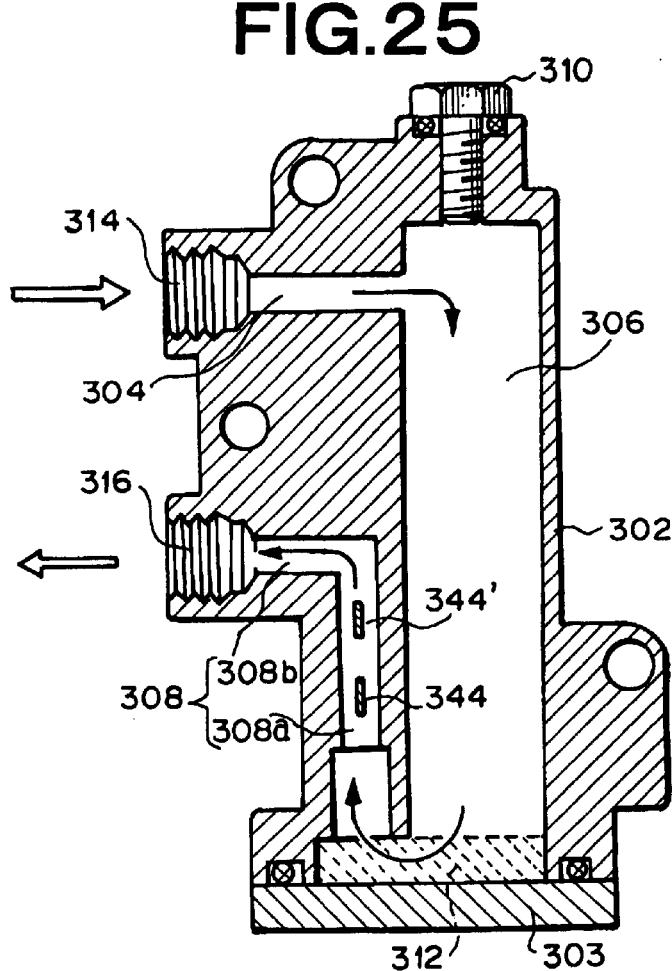
FIG. 25 is a cross-sectional view showing an embodiment of the flowmeter according to the present invention;.
Figure 26:
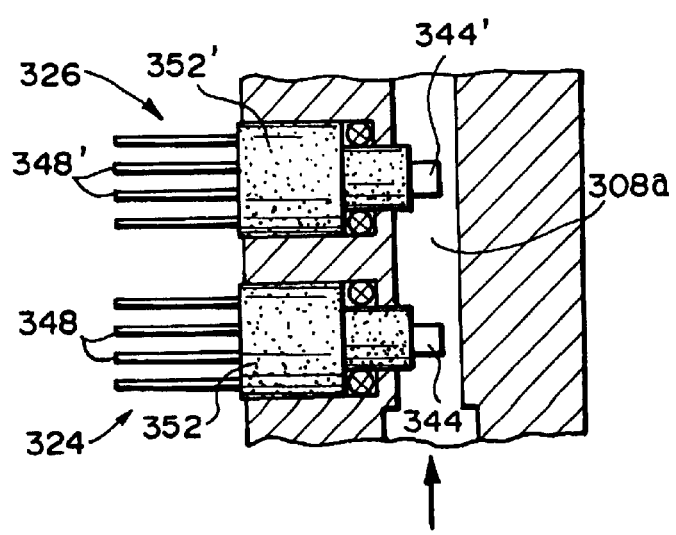
FIG. 26 is a partial cross-sectional view showing the embodiment of the flowmeter according to the present invention.
Figure 30:
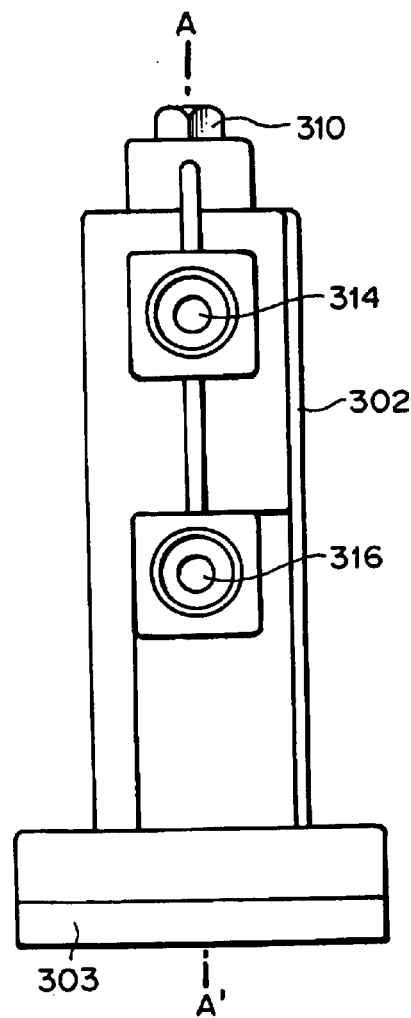
FIG. 30 is a left side view showing the embodiment of the flowmeter according to the present invention.
Figure 31:
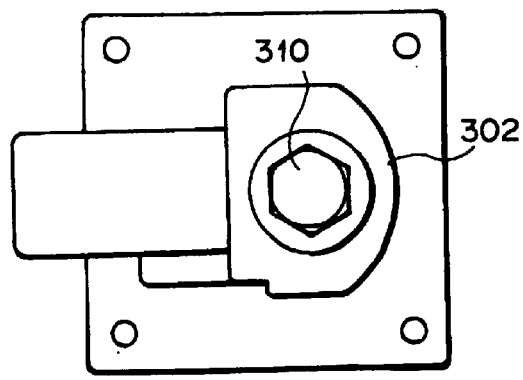
FIG. 31 is a plan view showing the embodiment of the flowmeter according to the present invention.

FIG. 25 is a cross-sectional view showing an embodiment of the flowmeter according to the present invention, and FIG. 26 is a partial cross-sectional view of the flowmeter of this embodiment. FIG. 27 is a front view of the flowmeter of this embodiment, FIG. 28 is a right side view of the flowmeter of this embodiment, FIG. 29 is a bottom view of the flowmeter of this embodiment when some parts are removed, FIG. 30 is a left side view of the flowmeter of this embodiment, and FIG. 31 is a plan view of the flowmeter of this embodiment. FIG. 25 is an A–A' cross-sectional view of FIG. 30, and FIG. 26 is a B–B' partial cross-sectional view of FIG. 27.

In these figures, three portions 304, 306, 308 constituting a fluid flow passage are formed in a casing member 302 formed of material having excellent thermal conductivity such as aluminum or the like. The flow passage portion 304 intercommunicates with a fluid flow-in port 314, and the flow passage portion 308 intercommunicates with a fluid flow-out port 316. The fluid flowing from the fluid flow-in port 314 into the flow passage portion 304 passes through the flow passage portion 306 and the flow passage portion 308 and then flows out from the fluid flow-out port 316 (in the flowing direction as indicated by an arrow). The flow passage portion 306 constitutes a fluid residence area. A lid member 303 is detachably mounted at the lower portion of the casing member 302, and the lid member 303 constitutes a part of the casing member 302.

The flow passage portion 304 extends in the horizontal direction, the flow passage portion 306 extends in the vertical direction, and the flow passage portion 308 comprises a vertical portion 308a extending in the vertical direction and a horizontal portion 308b extending in the horizontal direction. A fluid supply source side pipe is connected to the fluid flow-in port 314, and a fluid demand side pipe is connected to the fluid flow-out port 316.

A male screw 310 is detachably screwed in the casing member 302 so as to close the port intercommunicating with the upper portion of the flow passage portion 306. A filter 312 including non-woven fabric comprising glass fiber, plastic fiber or the like which is held by a proper holder may be interposed in the intercommunication portion between the flow passage portion 306 and the flow passage portion 308.

A flow rate detecting unit 324 and a fluid temperature detecting unit 326 are secured to the casing member 302 so as to face the vertical portion 308a of the flow passage portion 308. The flow rate detecting unit 324 has the construction as shown in FIG. 23. The fluid temperature detecting unit 326 has the same construction as the flow rate detecting unit 324 except that a fluid temperature detector is used in place of the flow rate detector. The fluid temperature detector has the same construction except that the thin-film heating element is removed from the flow rate detector.

The end portions of fin plates 344, 344' projecting from the housings 352, 352' of the flow rate detecting unit 324 and the fluid temperature detecting unit 326 extend into the vertical portion 308a of the flow passage portion 308 of the casing member 302. The fin plates 344, 344' extend to pass through the center in the cross section of the flow passage portion 308 having the substantially circular cross section. The fin plates 344, 344' are arranged along the flow direction of the fluid in the flow passage portion 308, so that heat transfer can be excellently performed between each of the flow rate detector 342 and the fluid temperature detector 342' and the fluid without greatly affecting the flow of the fluid.

FIG. 29 is a bottom diagram when the lid member 303 described above is removed, and shows the flow passage portion 306 and the vertical portion 308a of the flow passage portion 308. In this embodiment, as shown in FIGS. 29 and 25, the flow passage portion (fluid residence area) 306 is formed so that the cross section thereof is sufficiently larger than the cross section of the flow passage portion 308. The cross section of the flow passage portion 306 is set to be five times or more, preferably ten times or more as large as that of the flow passage portion 308, The volume of the flow passage portion 306 is larger than the volume per unit length of the vertical portion 308a of the flow passage portion 308 at which the flow rate detecting unit 324 and the fluid temperature detecting unit 326 are located. The volume of the flow passage portion 306 is preferably 50 times or more, more preferably 100 times or more, as large as the volume per unit length of the vertical portion 308a.

As described above, the flow passage portion 306 is located at the upstream side, with respect to the fluid flowing direction, of the vertical portion 308a of the flow passage portion 308 at which the heat exchange for the flow rate detection is carried out, and it constitutes an area where the fluid flowing into the flow passage portion 308 stays temporarily. The fluid flow velocity at the flow passage portion 306 is smaller than that at the vertical portion 308a of the flow passage portion 308, and is preferably equal to $\frac{1}{5}$ or less, more preferably $\frac{1}{10}$ or less, of the fluid flow velocity at the vertical portion 308a.

Further, the vertical portion 308a of the flow passage portion 308 extends in parallel to and proximately to the flow passage portion 306, and thus it is disposed to be liable to suffer thermal influence of the fluid in the flow passage portion 306.

The cross section of the flow passage portion 304 is smaller than the cross section of the flow passage portion 306, and it is set to the same level as the cross section of the flow passage portion 308. Accordingly, the fluid flow velocity in the flow passage portion 304 is the same level as the fluid flow velocity in the flow passage portion 308.

Figure 32:
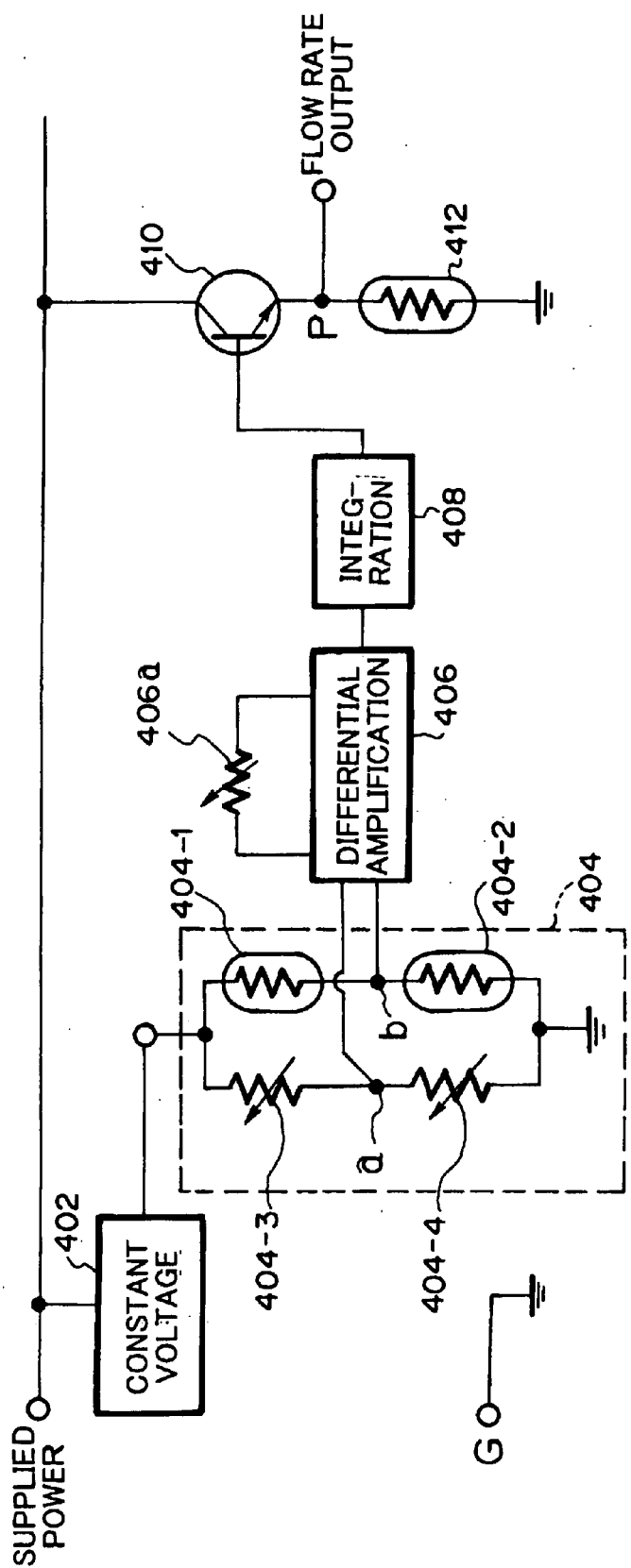
FIG. 32 is a schematic diagram showing a flow rate detection system of the embodiment of the flowmeter according to the present invention.

FIG. 32 is a schematic diagram showing a flow rate detection system of a thermal flowmeter according to this embodiment. A DC voltage is applied from a constant voltage circuit 402 to a bridge circuit (detection circuit) 404. The bridge circuit 404 comprises a flow rate detecting thin-film temperature sensing element 404-1 of a flow rate detecting unit 324, a temperature compensating thin-film temperature sensing element 404-2 of a fluid temperature detecting unit 326 and variable resistors 404-3, 404-4. The potential Va, Vb at the point a, b of the bridge circuit 404 is input to a differential amplifying circuit 406, and the output of the differential amplifying circuit 406 is input to an integrating circuit 408.

The DC voltage from a power supply source is supplied to a thin-film heating element 412 of the flow rate detecting unit 324 through a transistor 410 for controlling current to be supplied to the thin-film heating element 412. That is, in the flow rate detector of the flow rate detecting unit 324, the thin-film temperature sensing element 404-1 carries out the temperature sensing operation on the basis of the heating of the thin-film heating element 412 with being affected by the endothermic action of the fluid to be detected through the fin plate 344. As a result of the temperature sensing operation, the differential between the potential Va at the point a of the bridge circuit 404 and the potential Vb at the point b of the bridge circuit 404 shown in FIG. 32 is achieved.

The value of (Va-Vb) is varied due to variation of the temperature of the flow rate detecting temperature sensing element 404-1 in accordance with the flow rate of the fluid. By properly setting the resistance values of the resistors 404-3, 404-4 of the bridge circuit 404 in advance, the value of (Va-Vb) can be set to zero when the fluid flow rate is equal to a desired value (reference value). At the reference flow rate value, the output of the integrating circuit 408 is equal to a fixed value (the value corresponding to the reference flow rate value), and the resistance value of the transistor 410 is equal to a fixed value. In this case, a divided voltage to be applied to the thin-film heating element 412 is also equal to a fixed value, and thus the voltage at the point P at this time indicates the reference flow rate value.

When the fluid flow rate is increased/reduced, the output of the differential amplifying circuit 406 varies in polarity (varied in accordance with positive/negative sign of the resistance-temperature characteristic of the flow detecting temperature sensing element 404-1) and magnitude, and the output of the integrating circuit 408 is varied in accordance with the variation in polarity and magnitude of the output of the differential amplifying circuit 406.

When the fluid flow rate is increased, the temperature of the flow rate detecting temperature sensing element 404-1 is reduced, and thus the integrating circuit 408 supplies the base of the transistor 410 with such a control input that the resistance value of the transistor 410 is reduced to thereby increase the heating value of the thin-film heating element 412 (that is, to increase the power).

On the other hand, when the fluid flow rate is reduced, the temperature of the flow rate detecting temperature sensing element 404-1 increases, and thus the integrating circuit 408 supplies the base of the transistor 410 with such a control input that the resistance value of the transistor 410 is increased to thereby reduce the heating value of the thin-film heating element 412 (that is, to reduce the power).

As described above, the heating of the thin-film heating element 412 is feed-back controlled so that the temperature detected by the flow rate detecting temperature sensing element 404-1 is equal to a target value irrespective of the variation of the fluid flow rate. Further, the voltage (the voltage at the point P) applied to the thin-film heating element 412 corresponds to the fluid flow rate, and thus it is taken out as an output of the flow rate.

As in the case of the above embodiment, the flow rate output is properly A/D-converted by the A/D converter, and subjected to operation processing such as integration, etc. by CPU, and then the flow rate is displayed by the display portion. On the basis of the instruction from CPU, the instantaneous flow rate and the integrated flow rate can be properly stored in the memory. Further, these data may be transmitted to the outside through a communication line such as a telephone line or other networks.

In this embodiment, since the flow passage portion 306 constitutes the fluid residence area, the fluid flow velocity at the flow passage portion 306 is low, and even when the temperature of the fluid flowing from the flow passage portion 304 into the flow passage portion 306 varies sharply, the fluid newly supplied into the flow passage portion 306 is mixed with the fluid which has already existed in the flow passage portion 306 before the temperature variation occurs, and thus there exists a time margin for averaging of the fluid temperature, so that the temperature variation of the fluid supplied to the flow passage portion 308 is moderated. In addition, the casing member 302 is formed of metal having excellent thermal conductivity, so that even when the temperature of the fluid flowing into the fluid flow passage of the casing member 302 varies sharply, the averaging of the temperature of the fluid in the flow passage is promoted by thermal conduction of the casing member 302, so that the effect of the sharp variation of the temperature of the flow-in fluid is moderated.

As described above, according to this embodiment, the temperature variation of the fluid in the vertical portion 308a of the flow passage portion 308 at which the flow rate detecting unit 324 and the fluid temperature detecting unit 326 are located is moderated. Therefore, even when the temperature of the flow-in fluid varies sharply, the fluid temperature detected by the fluid temperature detecting unit 326 is substantially equal to the temperature of the fluid for which the flow rate is detected in the flow rate detecting unit 324, so that the fluid temperature can be surely compensated and the precision of the flow rate detection can be enhanced. The fluid temperature variation in the vertical portion 308a of the flow passage portion 308 at which the flow rate detecting unit 324 and the fluid temperature detecting unit 326 are located is moderated, so that the operation of the control system can be stabilized, and from this viewpoint, the flow rate detection precision can be enhanced.

INDUSTRIAL APPLICABILITY

As described above, according to the flowmeter of the present invention, the flow rate can be measured with excellent precision over a broad flow rate range.

According to the present invention, by combining the two types of control operation, one of which is to properly set, on the basis of the count value achieved within a predetermined time period, the base voltage within the subsequent predetermined time period, and the other of which is to properly set the applying period of the addition voltage in accordance with the output of the comparator, the response of the heater control can be enhanced, the precision of the flow rate measurement can be enhanced and the thermal hysteresis can be reduced without complicating the circuit construction.

Further, according to the present invention, the data interpolation calculation is carried out to achieve the instantaneous flow rate value at the environmental temperature, thereby reducing the data volume of the instantaneous flow rate conversion table, and the variation of the measurement value due to the environmental temperature is prevented to perform the extremely high-precision flow rate measurement.

Still further, according to the flowmeter of the present invention, the flow rate can be measured with excellent precision over a board flow rate range without increasing the capacity of the memory for storing the calibration curves so much.

Still further, according to the present invention, the fluid residence area is formed at the upstream of the flow rate detecting unit and the fluid temperature detecting unit in the fluid flow passage, whereby the fluid temperature compensation can be surely performed even when the temperature of flow-in fluid varies sharply, thereby enhancing the precision of the flow rate detection.

What is claimed is:

1. A flowmeter having an indirectly heated type flow rate sensor unit in which a flow rate detector containing a heating element and a temperature sensing element for flow rate detection is joined to a heat transfer member for flow rate detection, a fluid flow rate value being achieved with calibration curves on the basis of the output of a detection circuit using a bridge circuit containing the temperature sensing element for flow rate detection as a constituent resistor, characterized in that said bridge circuit includes circuit characteristic value variation driving means for varying the circuit characteristic value thereof in plural steps, plural calibration curves are provided in association with the respective steps of the circuit characteristic value, any one of the plural calibration curves is selected in conformity with the step of the circuit characteristic value selected by said circuit characteristic value variation driving means, a fluid flow rate range to be measured is set every calibration curve, the overall measurement flow rate range is covered by the plural fluid flow rate ranges, and said circuit characteristic value variation driving means is controlled in accordance with the fluid flow rate value achieved to use one of the calibration curves corresponding to the flow rate range to which the flow rate value belongs.

2. The flowmeter as claimed in claim 1, wherein the respective neighboring flow rate ranges are partially overlapped with each other, and the selective switching from one of the two calibration curves corresponding to the two partially-overlapped flow rate ranges to the other calibration curve is carried out at the end portion of the one flow rate range.

3. The flowmeter as claimed in claim 1, wherein said flow rate sensor unit has a fluid temperature detector containing a fluid temperature detecting temperature sensing element and a fluid temperature detecting heat transfer member joined to said fluid temperature detector, and said bridge circuit contains said fluid temperature detecting temperature sensing element as a constituent resistor.

4. The flowmeter as claimed in claim 1, wherein said circuit characteristic value variation driving means is a multiplexer for selectively connecting an output terminal of said bridge circuit to any one of connection terminals between any two neighboring resistors of plural resistors which are provided to said bridge circuit so as to be connected to one another in series.

5. The flowmeter as claimed in claim 1, wherein said circuit characteristic value variation driving means carries out a switch-ON/OFF operation of switches of a bypass which are connected in parallel to at least one of plural resistors which are provided to said bridge circuit so as to be connected in series to one another.

6. The flowmeter as claimed in claim 5, wherein each of said switches comprises a field effect transistor.

* * * * *